US012745272B2

(12) United States Patent
Kim et al.

(10) Patent No.: US 12,745,272 B2
(45) Date of Patent: Sep. 22, 2026

(54) ELECTRONIC DEVICE FOR PERFORMING NETWORK REGISTRATION PROCEDURE AND OPERATING METHOD THEREOF

(71) Applicant: Samsung Electronics Co., Ltd., Suwon-si (KR)

(72) Inventors: Dooyoung Kim, Suwon-si (KR); Keonyoung Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 276 days.

(21) Appl. No.: 18/520,968

(22) Filed: Nov. 28, 2023

(65) Prior Publication Data

US 2024/0224307 A1 Jul. 4, 2024

Related U.S. Application Data

(63) Continuation of application No. PCT/KR2023/019117, filed on Nov. 24, 2023.

(30) Foreign Application Priority Data

Dec. 30, 2022 (KR) ........................ 10-2022-0190570
Mar. 20, 2023 (KR) ........................ 10-2023-0036072

(51) Int. Cl.
*H04W 72/51* (2023.01)
*H04W 60/04* (2009.01)
(Continued)

(52) U.S. Cl.
CPC ........... *H04W 72/51* (2023.01); *H04W 60/04* (2013.01); *H04W 72/21* (2023.01); *H04W 76/30* (2018.02)

(58) Field of Classification Search
CPC ..... H04W 72/51; H04W 72/21; H04W 76/30; H04W 76/10; H04W 76/00; H04W 8/02; H04W 24/02; H04W 36/00
See application file for complete search history.

(56) References Cited

U.S. PATENT DOCUMENTS 10,998,995 B2 5/2021 Rico Alvarino et al.
2012/0076076 A1* 3/2012 Kim ...................... H04W 76/10 370/328

(Continued)

FOREIGN PATENT DOCUMENTS

CN 103188820 A 7/2013
CN 111246528 A * 6/2020 ........ H04W 36/0066

(Continued)

OTHER PUBLICATIONS

International Search Report dated Feb. 22, 2024, issued in International Patent Application No. PCT/KR2023/019117.

(Continued)

*Primary Examiner* — Shean Tokuta
(74) *Attorney, Agent, or Firm* — Jefferson IP Law, LLP

(57) ABSTRACT

An electronic device includes a communication circuit, a processor, and memory storing instructions. The instructions, when executed by the processor, cause the electronic device to receive, a user equipment (UE) capability enquiry (UCE) message requesting to transfer capability information of the electronic device from a network, transmit a UE capability information (UCI) message including the capability information of the electronic device to the network, in response to the UCI message, identify whether a message is received from the network within a set time, identify whether the message is a radio resource control (RRC) connection release message indicating to release an RRC connection, and based on identifying that the message is the RRC connection release message, identify that a version number of a technical specification (TS) release operated in the electronic device is different from a version number of a TS release operated in the network.

20 Claims, 15 Drawing Sheets

(51) Int. Cl.

| | |
|---|---|
| ***H04W 72/21*** | (2023.01) |
| ***H04W 76/30*** | (2018.01) |

(56) References Cited

U.S. PATENT DOCUMENTS

| | | | | |
|---|---|---|---|---|
| 2013/0223323 | A1 | 8/2013 | Jang et al. | |
| 2013/0322302 | A1 | 12/2013 | Gholmieh et al. | |
| 2014/0079021 | A1* | 3/2014 | Hsu | H04W 48/18 370/331 |
| 2016/0242191 | A1* | 8/2016 | Liao | H04W 24/10 |
| 2018/0343689 | A1 | 11/2018 | Wu et al. | |
| 2020/0053522 | A1 | 2/2020 | Suda et al. | |
| 2020/0053642 | A1* | 2/2020 | Huang-Fu | H04L 45/85 |
| 2020/0314718 | A1 | 10/2020 | Buyukdura et al. | |
| 2021/0059002 | A1 | 2/2021 | Fiorani et al. | |
| 2021/0212145 | A1 | 7/2021 | Ohlsson et al. | |
| 2022/0167298 | A1 | 5/2022 | Kang et al. | |
| 2022/0240170 | A1 | 7/2022 | Park et al. | |
| 2022/0360975 | A1* | 11/2022 | Oh | H04W 60/04 |
| 2023/0239683 | A1 | 7/2023 | Xu et al. | |
| 2024/0224307 | A1* | 7/2024 | Kim | H04W 76/10 |

FOREIGN PATENT DOCUMENTS

| | | | | | |
|---|---|---|---|---|---|
| EP | 2592866 | A1 | * | 5/2013 | H04W 36/0085 |
| EP | 3117675 | B1 | | 4/2020 | |
| EP | 4626060 | A1 | * | 10/2025 | H04W 72/21 |
| KR | 10-2012-0031546 | A | | 4/2012 | |
| KR | 10-2019-0010741 | A | | 1/2019 | |
| KR | 10-2020-0106702 | A | | 9/2020 | |
| KR | 10-2020-0138366 | A | | 12/2020 | |
| KR | 10-2021-0046189 | A | | 4/2021 | |
| KR | 102250169 | B1 | * | 5/2021 | H04L 67/51 |
| KR | 10-2022-0137092 | A | | 10/2022 | |
| KR | 10-2022-0149358 | A | | 10/2022 | |
| KR | 20240108197 | A | * | 7/2024 | H04W 72/21 |
| VN | 10026734 | B | * | 12/2020 | |
| WO | WO-2017143609 | A1 | * | 8/2017 | H04W 76/38 |
| WO | 2018-216163 | S | | 11/2018 | |
| WO | WO-2024059015 | A1 | * | 3/2024 | H04B 17/346 |
| WO | WO-2024143927 | A1 | * | 7/2024 | H04W 36/00 |

OTHER PUBLICATIONS

Extended European Search Report dated Feb. 19, 2026; European Appln. No. 23912602.2-1206 / 4626060 PCT/KR2023019117.

* cited by examiner

ELECTRONIC DEVICE FOR PERFORMING NETWORK REGISTRATION PROCEDURE AND OPERATING METHOD THEREOF

CROSS-REFERENCE TO RELATED APPLICATION(S)

This application is a continuation application, claiming priority under § 365(c), of an International application No. PCT/KR2023/019117, filed on Nov. 24, 2023, which is based on and claims the benefit of a Korean patent application number 10-2022-0190570, filed on Dec. 30, 2022, in the Korean Intellectual Property Office, and of a Korean patent application number 10-2023-0036072, filed on Mar. 20, 2023, in the Korean Intellectual Property Office, the disclosure of each of which is incorporated by reference herein in its entirety.

TECHNICAL FIELD

The disclosure relates to an electronic device for performing a network registration procedure and an operating method thereof.

BACKGROUND ART

In order to meet the demand for wireless data traffic soaring since a 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system. For higher data transmit rates, 5G communication systems are considered to be implemented on ultra-high frequency bands (millimeter wave (mmWave)), such as, e.g., 60 gigahertz (GHz).

To mitigate path loss on the ultra-high frequency band and increase the reach of radio waves, various techniques, such as a beamforming technology, a massive multi-input multi-output (MIMO) technology, a full dimensional MIMO (FD-MIMO) technology, an array antenna technology, an analog beamforming technology, and a large scale antenna technology, are taken into account for the 5G communication system.

Also being developed are various technologies for the 5G communication system to have an enhanced network, such as an evolved or advanced small cell technology, a cloud radio access network (cloud RAN) technology, a ultra-dense network technology, a device-to-device communication (D2D) technology, a wireless backhaul technology, a moving network technology, a cooperative communication, coordinated multi-point (COMP) technology, and an interference cancellation technology.

There are also other various schemes under development for the 5G system including, e.g., a hybrid frequency shift keying (FSK) and quadrature amplitude modulation (QAM) (FQAM) scheme and a sliding window superposition coding (SWSC) scheme, which are advanced coding modulation (ACM) schemes, and a filter bank multi-carrier (FBMC) scheme, a non-orthogonal multiple access (NOMA) scheme and a sparse code multiple access (SCMA) scheme, which are advanced access schemes.

Currently, many network operators are in a situation where they are trying to launch a technical specification (TS) release with a specific version number (e.g., a 3rd generation partnership project (3GPP) TS release 16). The 3GPP TS release 16 may refer to a TS with a version number 16 provided by 3GPP. The 3GPP TS release 16 includes various functions compared to previous 3GPP TS releases (e.g., 3GPP TS release 15). The various functions provided in the 3GPP TS release 16 may include a function of transmitting a user equipment (UE) capability information (UCI) message which is based on a uplink (UL) radio resource control (RRC) segmentation function and/or a function which is based on user assistance information (UAI) and a wake up signal (WUS).

Despite the network operators' efforts to launch the 3GPP TS release 16, some of base stations (e.g., a femto cell installed by an individual user) currently operated in a wireless communication system are still operated based on a 3GPP TS release 15. In this way, in a network situation in which base stations operated based on 3GPP TS releases with different version numbers coexist, if an electronic device upgrades a 3GPP TS release, there may be a possibility that a version number of a 3GPP TS release operated in the electronic device and a version number of a 3GPP TS release operated in a base station are different.

If the version number of the 3GPP TS release operated in the electronic device and the version number of the 3GPP TS release operated in the base station are different, due to a discrepancy between the 3GPP TS release operated in the electronic device and the 3GPP TS release operated in the base station, the electronic device may not register with the network. As such, as the electronic device may not register with the network, the electronic device may perform a network registration procedure again despite the discrepancy between the 3GPP TS release operated in the electronic device and the 3GPP TS release operated in the base station. However, due to the discrepancy between the 3GPP TS release operated in the electronic device and the 3GPP TS release operated in the base station, the network registration procedure performed again may also fail, and this continuous failure of the network registration procedure may result in unnecessary signaling overhead and power consumption of the electronic device, and degrade usability of the electronic device.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an electronic device for performing a network registration procedure and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a processor, and memory storing instructions.

According to an embodiment of the disclosure, the instructions, when executed by the processor, cause the electronic device to receive a user equipment (UE) capability enquiry (UCE) message requesting to transfer capability information of the electronic device from a network via the communication circuit.

According to an embodiment of the disclosure, the instructions, when executed by the processor, cause the electronic device to transmit a UE capability information (UCI) message including the capability information of the electronic device to the network via the communication circuit, in response to the UCE message.

According to an embodiment of the disclosure, the instructions, when executed by the processor, cause the electronic device to identify whether a message is received from the network via the communication circuit within a set time, in response to the UCI message.

According to an embodiment of the disclosure, the instructions, when executed by the processor, cause the electronic device to identify whether the message is a radio resource control (RRC) connection release message indicating to release an RRC connection, based on identifying that the message is received within the set time.

According to an embodiment of the disclosure, the instructions, when executed by the processor, cause the electronic device to identify that a version number of a technical specification (TS) release operated in the electronic device is different from a version number of a TS release operated in the network, based on identifying that the message is the RRC connection release message.

In accordance with another aspect of the disclosure, an electronic device is provided. The electronic device includes a communication circuit, a processor, and memory storing instructions.

According to an embodiment of the disclosure, the instructions, when executed by the processor, cause the electronic device to receive, from a network via the communication circuit, a message including information related to a version number of a technical specification (TS) release operated in the network.

According to an embodiment of the disclosure, the instructions, when executed by the processor, cause the electronic device to identify that a version number of a TS release operated in the electronic device is different from the version number of the TS release operated in the network, based on the information related to the version number of the TS release operated in the network.

In accordance with another aspect of the disclosure, a method is provided. The method includes receiving, a user equipment (UE) capability enquiry (UCE) message requesting to transfer capability information of an electronic device from a network.

According to an embodiment of the disclosure, the method includes transmitting a UE capability information (UCI) message including the capability information of an electronic device to the network, in response to the UCE message.

According to an embodiment of the disclosure, the method includes identifying whether a message is received from the network within a set time, in response to the UCI message.

According to an embodiment of the disclosure, the method includes identifying whether the message is a radio resource control (RRC) connection release message indicating to release an RRC connection, based on identifying that the message is received within the set time.

According to an embodiment of the disclosure, the method includes identifying that a version number of a technical specification (TS) release operated in the electronic device is different from a version number of a TS release operated in the network, based on identifying that the message is the RRC connection release message.

In accordance with another aspect of the disclosure, a method is provided. The method includes receiving, from a network, a message including information related to a version number of a technical specification (TS) release operated in the network.

According to an embodiment of the disclosure, the method includes identifying that a version number of a TS release operated in the electronic device is different from the version number of the TS release operated in the network, based on the information related to the version number of the TS release operated in the network.

In accordance with another aspect of the disclosure, one or more non-transitory computer readable storage medium is provided. The one or more non-transitory computer readable storage medium includes one or more programs, the one or more programs comprising instructions configured to, when executed by a processor of an electronic device, cause the electronic device to receive a user equipment (UE) capability enquiry (UCE) message requesting to transfer capability information of the electronic device from a network.

According to an embodiment of the disclosure, the instructions are configured to cause the electronic device to transmit a UE capability information (UCI) message including the capability information of the electronic device to the network, in response to the UCE message.

According to an embodiment of the disclosure, the instructions are configured to cause the electronic device to identify whether a message is received from the network within a set time, in response to the UCI message.

According to an embodiment of the disclosure, the instructions are configured to cause the electronic device to identify whether the message is a radio resource control (RRC) connection release message indicating to release an RRC connection, based on identifying that the message is received within the set time.

According to an embodiment of the disclosure, the instructions are further to cause the electronic device to identify that a version number of a technical specification (TS) release operated in the electronic device is different from a version number of a TS release operated in the network, based on identifying that the message is the RRC connection release message.

In accordance with another of the disclosure, one or more non-transitory computer readable storage medium is provided. The non-transitory computer readable storage medium includes one or more programs, the one or more programs comprising instructions configured to, when executed by a processor of an electronic device, cause the electronic device to receive, from a network, a message including information related to a version number of a technical specification (TS) release operated in the network.

According to an embodiment of the disclosure, the instructions are further configured to cause the electronic device to identify that a version number of a TS release operated in the electronic device is different from the version number of the TS release operated in the network, based on the information related to the version number of the TS release operated in the network.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
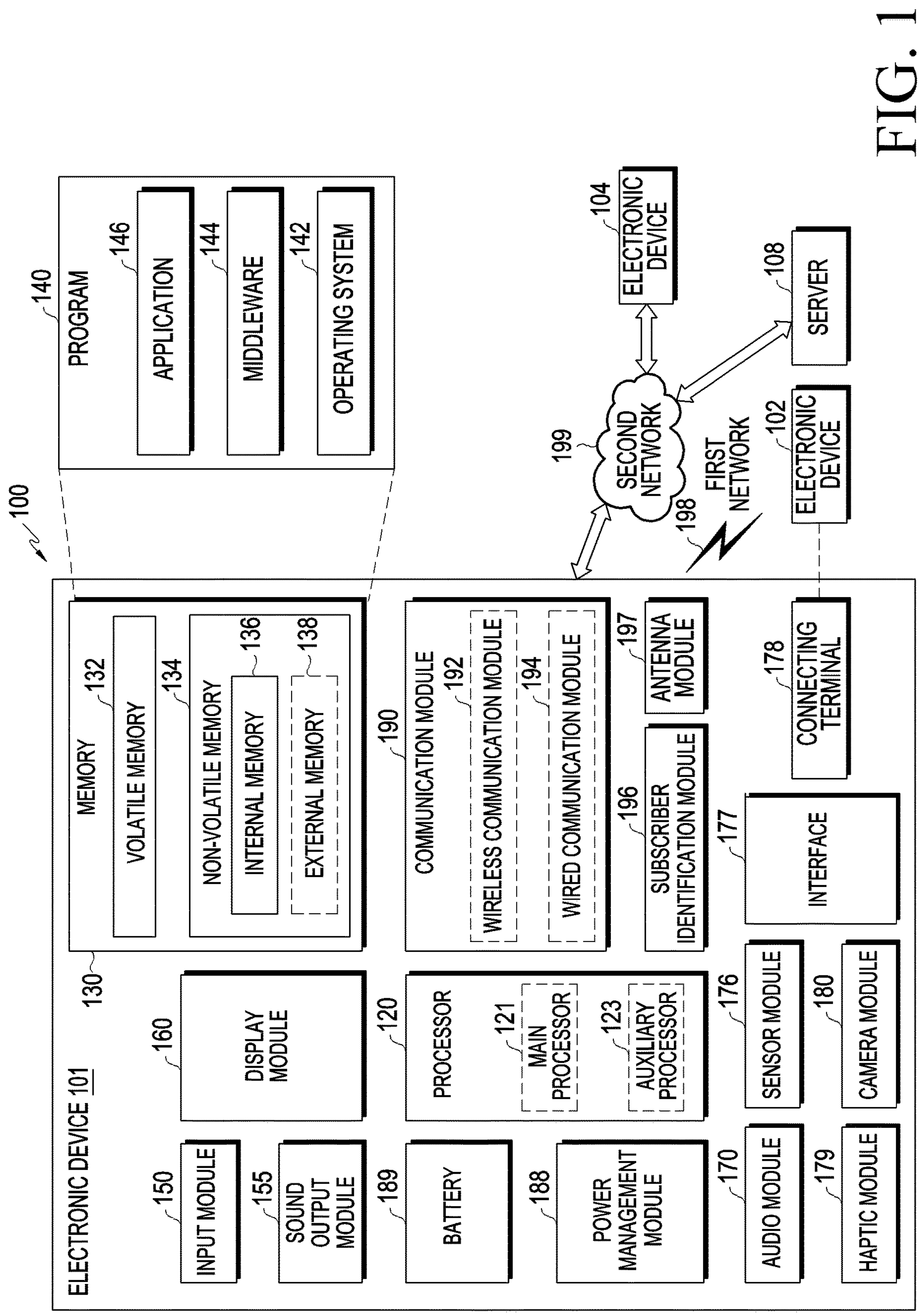
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It should be understood that the singular forms "a," "an," and "the" include plural referents unless the context clearly dictates otherwise. Thus, for example, reference to "a component surface" includes reference to one or more of such surfaces.

As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, an embodiment of the disclosure will be described in detail with reference to the accompanying drawings. Regardless of drawing signs, the same or like elements are provided with the same reference numeral, and a repeated description thereof will be omitted. Alternatively, in describing an embodiment of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, an electronic device will be described in an embodiment of the disclosure, but the electronic device may be referred to as a terminal, a mobile station, a mobile equipment (ME), a user equipment (UE), a user terminal (UT), a subscriber station (SS), a wireless device, a handheld device, and an access terminal (AT). Alternatively, in an embodiment of the disclosure, the electronic device may be a device having a communication function, such as, for example, a mobile phone, a personal digital assistant (PDA), a smart phone, a wireless MODEM, and a notebook.

Hereinafter, in an embodiment of the disclosure, a base station will be described as an example, but the base station may be referred to as at least one of a gNode B, a gNB, an eNode B, an eNB, a Node B, a BS, a radio access unit, a base station controller, or a node on a network. Further, the base station may be a network entity including at least one of an IAB-donor (integrated access and backhaul-donor) which is a gNB which provides a network attachment to an electronic device(s) through a network of backhaul and access links and an IAB-node which is a radio access network (RAN) node which supports NR attachment link(s) to the electronic device(s) and supports NR backhaul links to the IAB-donor or other IAB-node in a new radio (NR) system. In an embodiment of the disclosure, the electronic device may be wirelessly attached through the IAB-node and transmit/receive data with an IAB-donor connected to at least one IAB-node through a backhaul link.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to a particular embodiment and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or two or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2A:
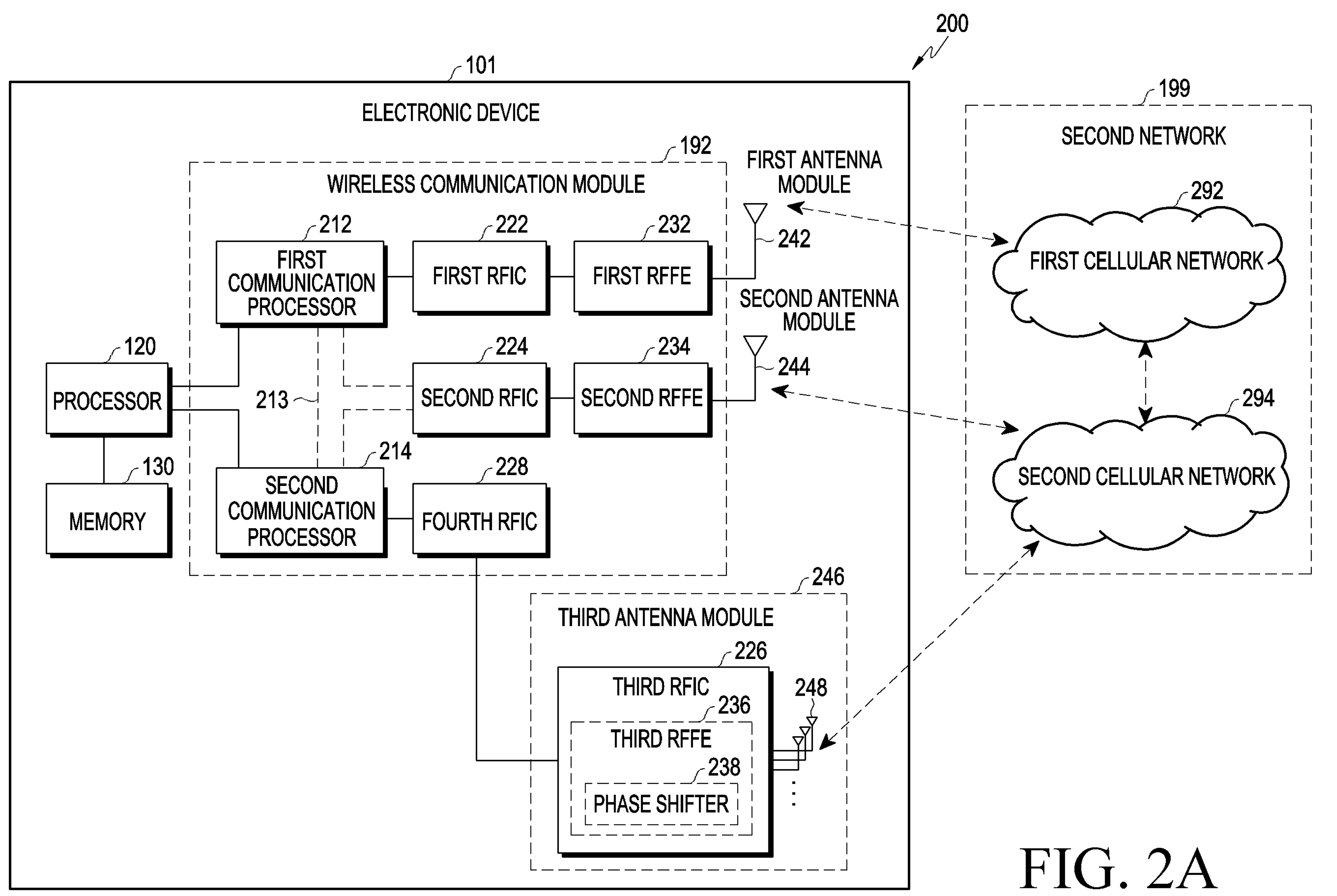
FIG. 2A is a block diagram illustrating an electronic device for supporting a legacy network communication and a 5th generation (5G) network communication according to an embodiment of the disclosure.

FIG. 2A is a block diagram 200 illustrating an electronic device 101 for supporting a legacy network communication and a 5th generation (5G) network communication according to an embodiment of the disclosure.

Referring to FIG. 2A, an electronic device 101 (e.g., an electronic device 101 in FIG. 1) may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 244, and antennas 248. The electronic device 101 may further include the processor 120 and the memory 130. A second network 199 may include a first cellular network 292 and a second cellular network 294. According to an embodiment of the disclosure, the electronic device 101 may further include at least one of the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may form at least part of a wireless communication module 192. According to an embodiment of the disclosure, the fourth RFIC 228 may be omitted or included as part of the third RFIC 226.

The first communication processor 212 may establish a communication channel in a band to be used for a wireless communication with the first cellular network 292 and support a legacy network communication via the established communication channel. According to an embodiment of the disclosure, the first cellular network 292 may be a legacy network including a 2nd generation (2G) network, a 3rd generation (3G) network, a 4th generation (4G) network, or a long term evolution (LTE) network. The second communication processor 214 may establish a communication channel corresponding to a specified band (e.g., about 6 GHz to about 60 GHZ) out of a band to be used for a wireless communication with the second cellular network 294 and support a 5G network communication via the established communication channel. According to an embodiment of the disclosure, the second cellular network 294 may be a 5G network defined by the 3rd generation partnership project (3GPP). Additionally, according to an embodiment of the disclosure, the first communication processor 212 or the second communication processor 214 may establish a communication channel corresponding to another specified band (e.g., about 6 GHz or less) out of the band to be used for the wireless communication with the second cellular network 294 and support a 5G network communication via the established communication channel.

The first communication processor 212 may transmit and receive data to and from the second communication processor 214. For example, data supposed to be transmitted via the second cellular network 294 may be scheduled to be transmitted via the first cellular network 292. In this case, the first communication processor 212 may receive transmission data from the second communication processor 214. For example, the first communication processor 212 may transmit and receive data to and from the second communication processor 214 via an inter-processor interface 213. The inter-processor interface 213 may be implemented as, for example, a universal asynchronous receiver/transmitter (UART) (e.g., high speed-UART (HS-UART)) or a peripheral component interconnect bus express (PCIe) interface, but a type thereof is not limited. Alternatively, the first communication processor 212 and the second communication processor 214 may exchange control information and packet data information by using, for example, a shared memory. The first communication processor 212 may transmit and receive various pieces of information, such as sensing information, information about output strength, and resource block (RB) allocation information to and from the second communication processor 214.

According to an embodiment of the disclosure, the first communication processor 212 may not be coupled directly to the second communication processor 214. In this case, the first communication processor 212 may transmit and receive data to and from the second communication processor 214 via the processor 120 (e.g., an application processor). For example, the first communication processor 212 and the second communication processor 214 may transmit and receive data to and from the processor 120 via an HS-UART interface or a PCIe interface, but a type of an interface is not limited. Alternatively, the first communication processor 212 and the second communication processor 214 may exchange control information and packet data information by using, for example, the processor 120 and the shared memory.

Figure 2B:
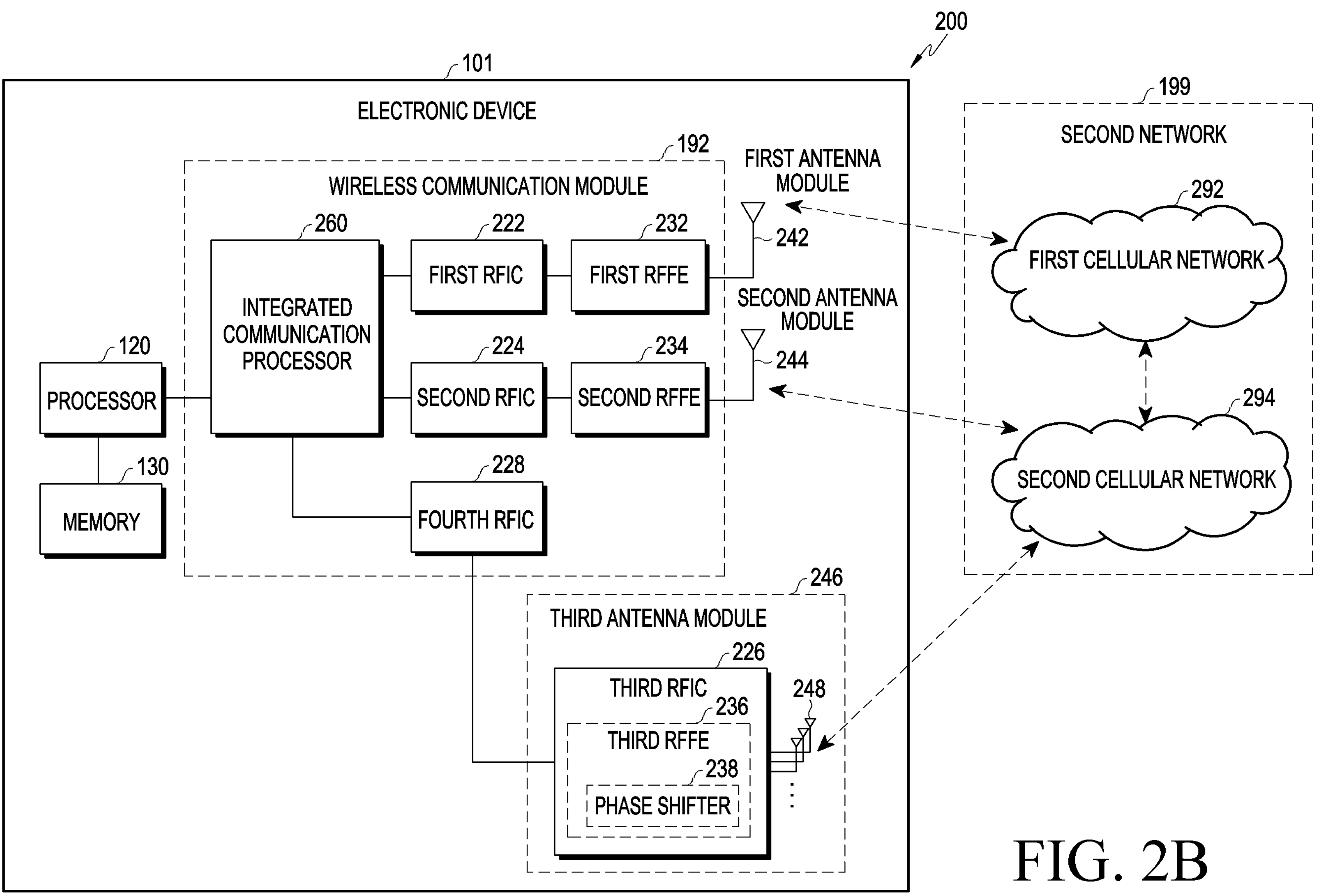
FIG. 2B is a block diagram illustrating an electronic device for supporting a legacy network communication and a 5G network communication according to an embodiment of the disclosure.

According to an embodiment of the disclosure, the first communication processor 212 and the second communication processor 214 may be incorporated in a single chip or a single package. According to an embodiment of the disclosure, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of a function for a communication with the first cellular network 292 and a function for a communication with the second cellular network 294.

For transmission, the first RFIC 222 may convert a baseband signal generated by the first communication processor 212 to a radio frequency (RF) signal in about 700 megahertz (MHz) to about 3 GHz used in the first cellular network 292 (e.g., the legacy network). For reception, an RF signal may be obtained from the first cellular network 292 via an antenna (e.g., the first antenna module 242) and pre-processed via an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second cellular network 294 (e.g., the 5G network). For reception, a 5G Sub6 RF signal may be obtained from the second cellular network 294 via an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHZ) used in the second cellular network 294. For reception, a 5G Above6 RF signal may be obtained from the second cellular network 294 via an antenna (e.g., the antenna 248) and pre-processed via the third RFFE 236. The third RFIC 226 may convert the pre-processed 5G Above6 RF signal to a baseband signal so that the baseband signal may be processed by the second communication processor 214. According to an embodiment of the disclosure, the third RFFE 236 may be formed as part of the third RFIC 226.

According to an embodiment of the disclosure, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHZ) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second cellular network 294 through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment of the disclosure, the first RFIC 222 and the second RFIC 224 may be implemented as at least part of a single chip or a single package. According to an embodiment of the disclosure, if the first RFIC 222 and the second RFIC 224 are implemented as a single chip or a single package in FIG. 2A or 2B, the first RFIC 222 and the second RFIC 224 may be implemented as an integrated RFIC. In this case, the integrated RFIC is connected to the first RFFE 232 and the second RFFE 234, so the integrated RFIC may convert a baseband signal into a signal of a band supported by the first RFFE 232 and/or the second RFFE 234, and transfer the converted signal to one of the first RFFE 232 and the second RFFE 234. According to an embodiment of the disclosure, the first RFFE 232 and the second RFFE 234 may be implemented as at least part of a single chip or a single package. According to an embodiment of the disclosure, at least one of the first antenna module 242 or the second antenna module 244 may be omitted or combined with the other antenna module to process RF signals in a plurality of corresponding bands.

According to an embodiment of the disclosure, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. This may reduce, for example, loss (e.g., attenuation) of a signal in a high frequency band (e.g., about 6 GHz to about 60 GHz) used for a 5G network communication, on the transmission line. Therefore, the electronic device 101 may increase quality or a speed of a communication with the second cellular network 294 (e.g., the 5G network).

According to an embodiment of the disclosure, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station in the 5G network) via a corresponding antenna element. During reception, each of the phase shifters 238 may change a phase of a 5G Above6 RF signal received from the outside via a corresponding antenna element to the same or substantially same phase. This enables transmission or reception via beamforming between the electronic device 101 and the outside.

The second cellular network 294 may be operated independently of the first cellular network 292 (e.g., stand-alone (SA)) or in connection to the first cellular network 292 (e.g., non-stand alone (NSA)). For example, in the 5G network, only an access network (e.g., a 5G radio access network (RAN) or next generation RAN (NG RAN)) may exist, and a core network (e.g., a next generation core (NGC)) may not exist. In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., new radio (NR) protocol information) may be stored in the memory 230 and accessed by another component (e.g., the processor 120, the first communication processor 212, or the second communication processor 214).

FIG. 2B is a block diagram 250 illustrating an electronic device for supporting a legacy network communication and a 5G network communication according to an embodiment of the disclosure.

Referring to FIG. 2B, an electronic device 101 (e.g., an electronic device 101 in FIG. 1) may include an integrated communication processor 260, a first RFIC 222, a second RFIC 224, a third RFIC 226, a fourth RFIC 228, a first RFFE 232, a second RFFE 234, a first antenna module 242, a second antenna module 244, a third antenna module 246, and/or antennas 248. The electronic device 101 may further include the processor 120 and the memory 130. A second network 199 may include a first cellular network 292 and a second cellular network 294.

In the block diagram 250 of the electronic device 101 shown in FIG. 2B comparing to the block diagram 200 of the electronic device 101 shown in FIG. 2A, it differs only in that the first communication processor 212 and the second communication processor 214 are implemented as the integrated communication processor 260, and the remaining components included in the block diagram 250 of the electronic device 101 may be implemented similarly or substantially the same as the components included in the block diagram 200 of the electronic device 101 shown in FIG. 2A, so a detailed description thereof will be omitted.

Figure 3A:
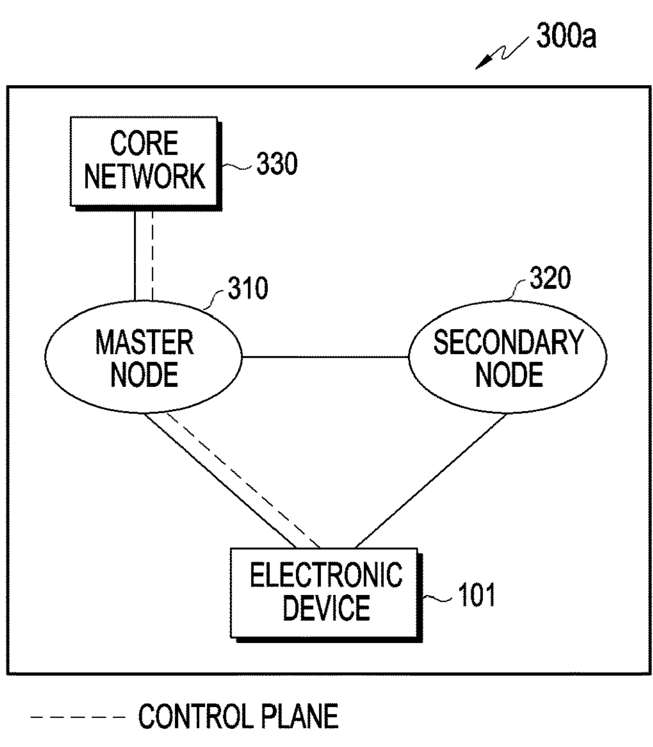
FIG. 3A is a diagram illustrating a wireless communication system which provides a legacy communication network and/or a 5G communication network according to an embodiment of the disclosure.

FIG. 3A is a diagram illustrating a wireless communication system which provides a legacy communication network and/or a 5G communication network according to an embodiment of the disclosure.

Referring to FIG. 3A, a network environment 300*a* may include at least one of a legacy network or a 5G network. In an embodiment of the disclosure, the legacy network may include a 4G or LTE base station (e.g., an eNodeB (eNB)) of the 3GPP standard supporting a wireless access of an electronic device 101 (e.g., an electronic device 101 in FIG. 1, 2A, or 2B), and an EPC which manages a 4G communication. The 5G network may include an NR base station (e.g., a gNodeB (gNB)) supporting a wireless access of the electronic device 101, and a 5GC which manages a 5G communication of the electronic device 101.

According to an embodiment of the disclosure, the electronic device 101 may transmit and receive a control message and user data via a legacy communication and/or 5G communication. The control message may include a message related to at least one of security control, bearer setup, authentication, registration, or mobility management of the electronic device 101. The user data may mean user data except for a control message transmitted and received between the electronic device 101 and a core network 330 (e.g., an EPC).

The electronic device 101 may transmit and receive at least one of a control message or user data to and from at least part (e.g., an NR base station and a 5GC) of the 5G network using at least part (e.g., an LTE base station and an EPC) of the legacy network.

According to an embodiment of the disclosure, the network environment 300*a* may include a network environment which provides dual connectivity (DC) to the LTE base station and the NR base station and transmits and receives a control message to and from the electronic device 101 via one core network 330 of the EPC or the 5GC.

According to an embodiment of the disclosure, in a DC environment, one of the LTE base station and the NR base station may operate as a master node (MN) 310 and the other may operate as a secondary node (SN) 320. The MN 310 may be connected to the core network 330 and transmit and receive a control message to and from the core network 330. The MN 310 and the SN 320 may be connected to each other via a network interface and transmit and receive a message related to management of a wireless resource (e.g., a communication channel) to and from each other.

According to an embodiment of the disclosure, the MN 310 may include the LTE base station, the SN 320 may include the NR base station, and the core network 330 may include the EPC. For example, a control message may be transmitted and received via the LTE base station and the EPC, and user data may be transmitted via at least one of the LTE base station or the NR base station.

According to an embodiment of the disclosure, the MN 310 may include the NR base station, the SN 320 may include the LTE base station, and the core network 330 may include the 5GC. For example, a control message may be transmitted and received via the NR base station and the 5GC, and user data may be transmitted via at least one of the LTE base station or the NR base station.

Figure 3B:
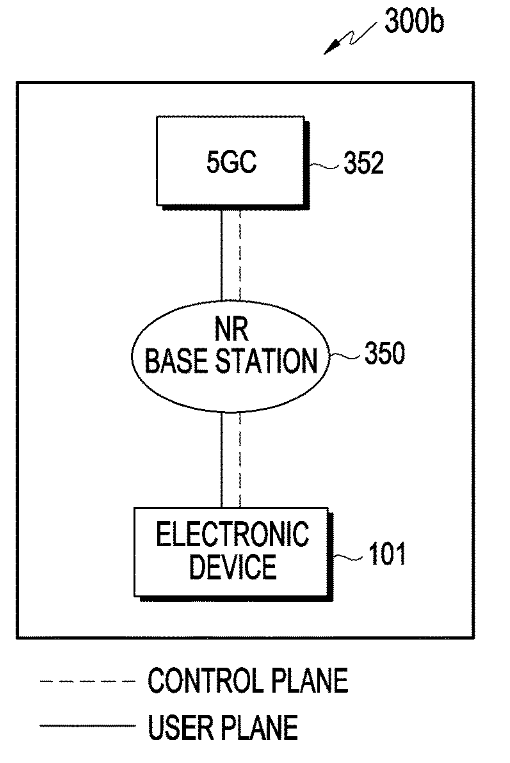
FIG. 3B is a diagram illustrating a wireless communication system which provides a legacy communication network and/or a 5G communication network according to an embodiment of the disclosure.

FIG. 3B is a diagram illustrating a wireless communication system which provides a legacy communication network and/or a 5G communication network according to an embodiment of the disclosure.

Referring to FIG. 3B, a network environment 300*b* may include at least one of a legacy network or a 5G network. In an embodiment of the disclosure, the legacy network may include a 4G or LTE base station (e.g., an eNodeB (eNB)) of the 3GPP standard supporting a wireless access of an electronic device 101 (e.g., an electronic device 101 in FIG. 1, 2A, or 2B), and an EPC which manages a 4G communication. The 5G network may include an NR base station 350 (e.g., a gNodeB (gNB)) supporting a wireless access of the electronic device 101, and a 5GC 352 which manages a 5G communication of the electronic device 101.

According to an embodiment of the disclosure, the electronic device 101 may transmit and receive a control message and user data through a legacy communication and/or a 5G communication.

The 5G network may include an NR base station 350 and a 5GC 352, and may transmit and receive a control message and user data independently from the electronic device 101.

Figure 3C:
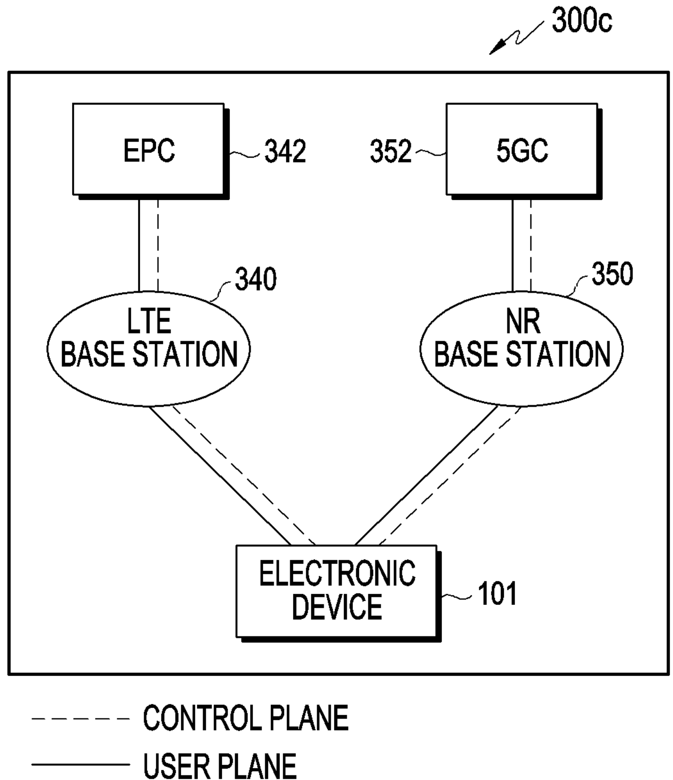
FIG. 3C is a diagram illustrating a wireless communication system which provides a legacy communication network and/or a 5G communication network according to an embodiment of the disclosure.

FIG. 3C is a diagram illustrating a wireless communication system which provides a legacy communication network and/or a 5G communication network according to an embodiment of the disclosure.

Referring to FIG. 3C, a network environment 300*c* may include at least one of a legacy network or a 5G network. In an embodiment of the disclosure, the legacy network may include a 4G or LTE base station 340 (e.g., an eNodeB (eNB)) of the 3GPP standard supporting a wireless access of an electronic device 101 (e.g., an electronic device 101 in FIG. 1, 2A, or 2B), and an EPC 342 which manages a 4G communication. The 5G network may include an NR base station 350 (e.g., a gNodeB (gNB)) supporting a wireless access of the electronic device 101, and a 5GC 352 which manages a 5G communication of the electronic device 101.

According to an embodiment of the disclosure, the electronic device 101 may transmit and receive a control message and user data through a legacy communication and/or a 5G communication.

Each of a legacy network and a 5G network according to an embodiment may independently provide data transmission and reception. For example, an electronic device 101 may transmit and receive a control message and user data to and from the EPC 342 via the LTE base station 340. For another example, the electronic device 101 may transmit and receive a control message and user data to and from the 5GC 352 via the NR base station 350.

According to an embodiment of the disclosure, the electronic device 101 may be registered in at least one of the EPC 342 or the 5GC 352, and transmit and receive a control message.

According to an embodiment of the disclosure, the EPC 342 and the 5GC 352 may interwork and manage a communication of the electronic device 101. For example, mobility information of the electronic device 101 may be transmitted and received via an interface between the EPC 342 and the 5GC 352.

As described above, DC through the LTE base station 340 and the NR base station 350 may be referred to as evolved-universal terrestrial radio access (E-UTRA) new radio dual connectivity (EN-DC).

Figure 4:
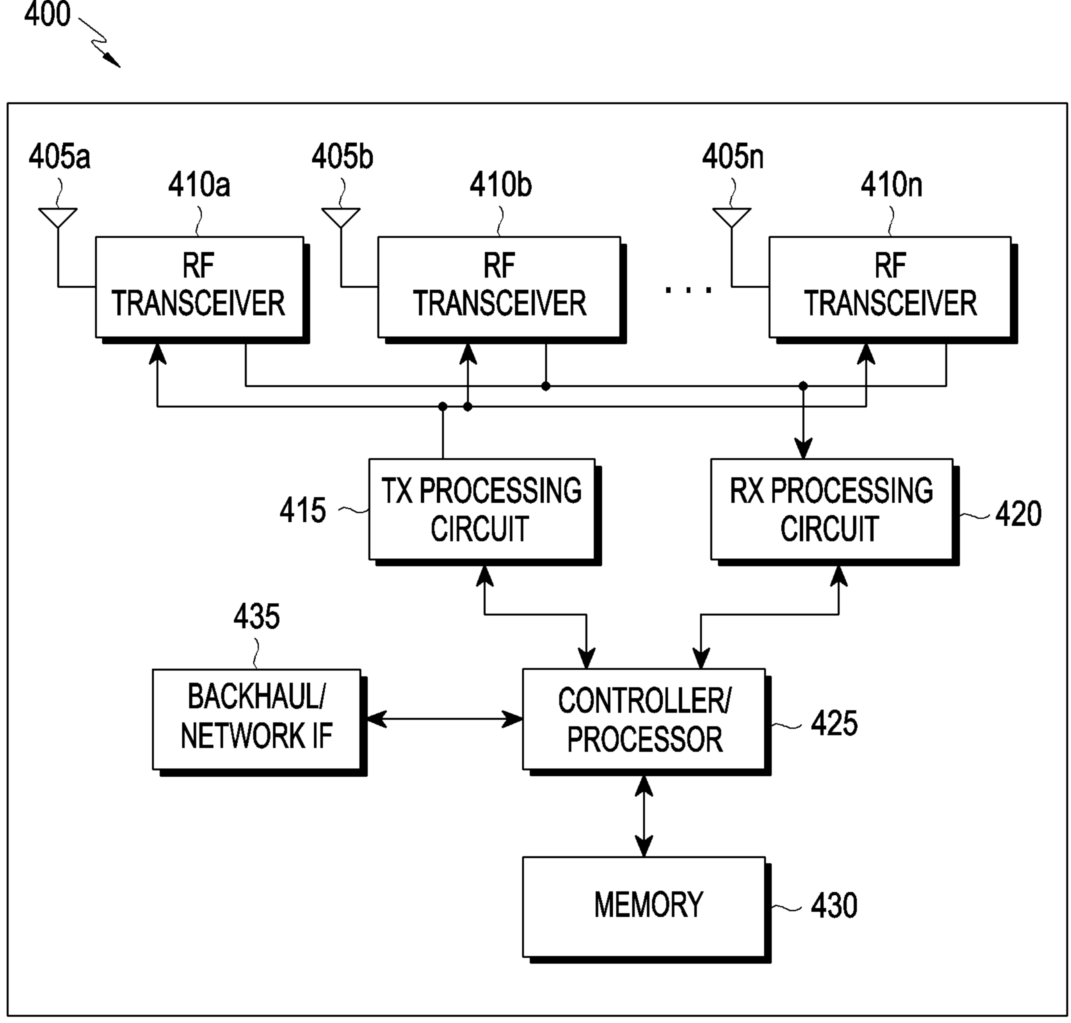
FIG. 4 is a block diagram illustrating an external electronic device according to an embodiment of the disclosure.

FIG. 4 is a block diagram illustrating an external electronic device according to an embodiment of the disclosure.

Referring to FIG. 4, an external electronic device 400 may be a network device (e.g., an MN 310 or an SN 320 in FIG. 3A, an NR base station 350 in FIG. 3B, or an LTE base station 340 or an NR base station 350 in FIG. 3C), an internal structure of the external electronic device 400 is only an example, and the internal structure of the external electronic device 400 may not be limited to implementation shown in FIG. 4. In an embodiment of the disclosure, the external electronic device 400 may include one of various network entities included in a wireless communication system, such as a base station or a mobility management entity (MME).

As illustrated in FIG. 4, the external electronic device 400 may include a plurality of antennas 405*a* to 405*n*, a plurality of radio frequency (RF) transceivers 410*a* to 410*n*, a transmit (TX) processing circuit 415, and a receive (RX) processing circuit 420. The external electronic device 400 may include a controller/processor 425, a memory 430, and a backhaul or network interface 435.

The RF transceivers 410*a* to 410*n* may receive input RF signals, such as signals transmitted from user terminals in the wireless communication network, via the antennas 405*a* to 405*n*. The RF transceivers 410*a* to 410*n* may down-convert the input RF signals to generate IF or baseband signals. The IF or baseband signals may be transmitted to the RX processing circuit 420, and the RX processing circuit 420 may filter, decode, and/or digitize the baseband or IF signals to generate processed baseband signals. The RX processing circuit 420 may transmit the processed baseband signals to the controller/processor 425 for further processing.

The TX processing circuit 415 may receive analog or digital data (e.g., speech data, web data, emails, or interactive video game data) from the controller/processor 425. The TX processing circuit 415 may encode, multiplex, and/or digitize the output baseband data to generate processed baseband or IF signals. The RF transceivers 410*a* to 410*n* may receive the processed baseband or IF signals output from the TX processing circuit 415 and up-convert the baseband or IF signals into RF signals which are to be transmitted via the antennas 405*a* to 405*n*.

The controller/processor 425 may include one or more processors or other processing devices that control the overall operation of the external electronic device 400. An operation of the external electronic device 400 will be described in detail below, so a detailed description thereof will be omitted herein.

For example, the controller/processor 425 may control reception of forward channel signals and transmission of reverse channel signals by the RF transceivers 410*a* to 410*n*, the RX processing circuit 420, and the TX processing circuit 415 according to known principles. The controller/processor 425 may support additional functions, such as more advanced wireless communication functions. For example, any one of various other functions may be supported by the controller/processor 425 in the external electronic device 400. In some embodiments of the disclosure, the controller/processor 425 includes at least one microprocessor or microcontroller. The controller/processor 425 may be implemented with at least one processor and may be referred to as a "processor."

The controller/processor 425 may also execute programs and other processes, e.g., an OS, resident in the memory 430. The controller/processor 425 may move data as required by a running process to the memory 430 or the outside of the memory 430. In certain embodiments of the disclosure, the controller/processor 425 supports a communication between network devices. The controller/processor 425 may move data into or out of the memory 430 depending on a process being executed.

The controller/processor 425 may be connected with the backhaul or network interface 435. The backhaul or network interface 435 may allow the external electronic device 400 to communicate with other electronic devices or systems over a backhaul connection or over a network. The backhaul or network interface 435 may support communications over any appropriate wired or wireless connection(s). For example, when the external electronic device 400 is implemented as a part of a cellular communication system (e.g., a cellular communication system supporting 5th generation (5G)/new radio (NR), long term evolution (LTE), or long term evolution-advanced (LTE-A)), the backhaul or network interface 435 may allow the external electronic device 400 to communicate with other network devices via a wired or wireless backhaul connection. When the external electronic device 400 is implemented as an access point, the backhaul or network interface 435 may allow the external electronic device 400 to communicate with a larger network (e.g., the Internet) via a wired or wireless local area network or a wired or wireless connection. The backhaul or network interface 435 may include an appropriate structure to support communications through a wired or wireless connection, such as Ethernet or RF transceiver.

Although FIG. 4 illustrates an example of the external electronic device 400, various changes may be made to FIG. 4. For example, the external electronic device 400 may include any number of such components as illustrated in FIG. 4. For example, an access point may include the backhaul or network interface 435, and the controller/processor 425 may support routing functions to route data between different network addresses. For example, although FIG. 4 illustrates that the external electronic device 400 includes a single instance of the TX processing circuit 415 and a single instance of the RX processing circuit 420, the external electronic device 400 may include multiple instances (e.g., one for each RF transceiver). Various components of FIG. 4 may be combined together, or each component may be further divided or some components may be omitted or, as necessary, more components may be added.

Currently, many network operators are in a situation where they are trying to launch a technical specification (TS) release with a specific version number (e.g., a 3rd generation partnership project (3GPP) TS release 16). The 3GPP TS release 16 may refer to a TS with a version number 16 provided by 3GPP. The 3GPP TS release 16 includes various functions compared to previous 3GPP TS releases (e.g., 3GPP TS release 15). The various functions provided in the 3GPP TS release 16 may include a function of transmitting a user equipment (UE) capability information (UCI) message which is based on a uplink (UL) radio resource control (RRC) segmentation function and/or a function which is based on user assistance information (UAI) and a wake up signal (WUS).

Despite the network operators' efforts to launch the 3GPP TS release 16, some of base stations (e.g., a femto cell installed by an individual user) currently operated in a wireless communication system may be still operated based on a 3GPP TS release 15. In this way, in a network situation in which base stations operated based on 3GPP TS releases with different version numbers coexist, if an electronic device upgrades a 3GPP TS release, there may be a possibility that a version number of a 3GPP TS release operated in the electronic device is different from a version number of a 3GPP TS release operated in a base station.

If the version number of the 3GPP TS release operated in the electronic device is different from the version number of the 3GPP TS release operated in the base station, due to a discrepancy between the 3GPP TS release operated in the electronic device and the 3GPP TS release operated in the base station, the electronic device may not register with the network. As such, as the electronic device may not register with the network, the electronic device may perform a network registration procedure again despite the discrepancy between the 3GPP TS release operated in the electronic device and the 3GPP TS release operated in the base station. However, due to the discrepancy between the 3GPP TS release operated in the electronic device and the 3GPP TS release operated in the base station, the network registration procedure performed again may also fail.

Table 1 below may show an electronic device log according to a unnecessary network access procedure which is repeatedly performed due to the discrepancy between the 3GPP TS release operated in the electronic device and the 3GPP TS release operated in the base station.

TABLE 1

```
2022 Nov 8 22:43:01.424 [16] 0xB0C0 LTE RRC OTA Packet -- BCCH_DL_SCH /
SystemInformationBlockType1
Radio Bearer ID = 0, Physical Cell ID = 499
Freq = 5230
    plmn-Identity
    {
      mcc
      {
        3,
        1,
        1
      },
      mnc
      {
        4,
        8,
        0
      }
    }.
2022 Nov 8 22:43:01.479 [A3] 0xB0ED LTE NAS EMM Plain OTA Outgoing Message -- Attach
request Msg
2022 Nov 8 22:43:01.563 [39] 0xB0C0 LTE RRC OTA Packet -- UL_DCCH /
RRCConnectionSetupComplete
2022 Nov 8 22:43:01.830 [F1] 0xB0ED LTE NAS EMM Plain OTA Outgoing Message --
Authentication response Msg
2022 Nov 8 22:43:01.926 [55] 0xB0ED LTE NAS EMM Plain OTA Outgoing Message --
Secunty mode complete Msg
2022 Nov 8 22:43:02.393 [55] 0xB0C0 LTE RRC OTA Packet -- UL_DCCH /
SecurityModeComplete
2022 Nov 8 22:43:02.418 [E9] 0xB0C0 LTE RRC OTA Packet -- UL_DCCH /
UECapabilityInformation
Radio Bearer ID = 1, Physical Cell ID = 499
Freq = 5230
value UE-EUTRA-Capability ::=
{
  accessStratumRelease rel16,
  ue-Category 4,
2022 Nov 8 22:43:07.300 [3B] 0xB0C0 LTE RRC OTA Packet -- DL_DCCH /
RRCConnectionRelease
2022 Nov 8 22.43.17.375 [ED] 0xB0ED LTE NAS EMM Plain OTA Outgoing Message -- Attach
request Msg
2022 Nov 8 22.43.33.529 [30] 0xB0ED LTE NAS EMM Plain OTA Outgoing Message -- Attach
request Msg
2022 Nov 8 22.43.50.078 [2A] 0xB0ED LTE NAS EMM Plain OTA Outgoing Message -- Attach
request Msg
2022 Nov 8 22.44.06.540 [AB] 0xB0ED LTE NAS EMM Plain OTA Outgoing Message -- Attach
request Msg
22:44:12.972 | 90.231515 | | reg_sim.c 2241 | 1 | [WARNING]
BACKOFF PLMN LIST (length = 1)
22:44:12.972 | 90.231518 | | reg_sim.c 2260 | 1 | [WARNING] 311-480
0 - Mode S1_N1(2) Cause MAX_REGISTRATION_FAILURE(2)   Verizon,USA
```

In Table 1, a version number of the 3GPP TS release operated by the electronic device is "16", and it may be seen that the electronic device receives a radio resource control (RRC) connection release message indicating to release an RRC connection from the network due to the discrepancy between the 3GPP TS release operated in the electronic device and the 3GPP TS release operated in the base station. As shown in Table 1, the electronic device transmits a user equipment (UE) capability information (UCI) message including an accessStratumRelease rel16 information element (IE) to the network, so it may be seen that the version number of the 3GPP TS release operated in the electronic device is "16". As such, it may be seen that the electronic device receives the RRC connection release message from the network even though the electronic device transmits the UCI message to the network based on the 3GPP TS release 16. In this case, the network may set a cause for releasing the RRC connection to a first value (e.g., "other") in the RRC connection release message, and the electronic device receiving the RRC connection release message having the cause set to the first value may not know the reason for releasing the RRC connection. So, it may be seen that the electronic device continuously transmits an attach request message to the network despite the discrepancy between the 3GPP TS release operated in the electronic device and the 3GPP TS release operated in the base station. The attach request message may be a message used to register the electronic device with the network.

This continuous failure of the network registration procedure may result in unnecessary signaling overhead and power consumption of the electronic device, and degrade usability of the electronic device.

Accordingly, the disclosure may provide an electronic device for identifying that a version number of a TS release operated in the electronic device is different from a version number of a TS release operated in a network and an operating method thereof.

The disclosure may provide an electronic device for performing a stable network registration procedure even if a version number of a TS release operated in the electronic device is different from a version number of a TS release operated in a network and an operating method thereof.

According to an embodiment of the disclosure, an electronic device (e.g., an electronic device 101 in FIG. 1, 2A, 2B, 3A, 3B, or 3C) may include a communication circuit (e.g., a communication module 190 in FIG. 1), a processor (e.g., the processor 120 in FIG. 1, the first communication processor 212 or a second communication processor 214 in FIG. 2A, or an integrated communication processor 260 in FIG. 2B), and memory (e.g., the memory 130 in FIG. 1) storing instructions.

According to an embodiment of the disclosure, the instructions, when executed by the processor, may cause the electronic device to receive, a user equipment (UE) capability enquiry (UCE) message requesting to transfer capability information of the electronic device from a network (e.g., an MN 310 or an SN 320 in FIG. 3A, an NR base station 350 in FIG. 3B, an LTE base station 340 or an NR base station 350 in FIG. 3C, or an external electronic device 400 in FIG. 4) via the communication circuit.

According to an embodiment of the disclosure, the instructions, when executed by the processor, may cause the electronic device to, in response to the UCE message, transmit a UE capability information (UCI) message including the capability information of the electronic device to the network via the communication circuit.

According to an embodiment of the disclosure, the instructions, when executed by the processor, may cause the electronic device to, in response to the UCI message, identify whether a message is received from the network via the communication circuit within a set time.

According to an embodiment of the disclosure, the instructions, when executed by the processor, may cause the electronic device to, based on identifying that the message is received within the set time, identify whether the message is a radio resource control (RRC) connection release message indicating to release an RRC connection.

According to an embodiment of the disclosure, the instructions, when executed by the processor, may cause the electronic device to, based on identifying that the message is the RRC connection release message, identify that a version number of a technical specification (TS) release operated in the electronic device is different from a version number of a TS release operated in the network.

According to an embodiment of the disclosure, the instructions, when executed by the processor, may cause the electronic device to, based on identifying that the message is not received within the set time, identify that the version number of the TS release operated in the electronic device is different from the version number of the TS release operated in the network.

According to an embodiment of the disclosure, the instructions, when executed by the processor, may cause the electronic device to establish the RRC connection with the network via the communication circuit before transmitting the UCI message.

According to an embodiment of the disclosure, the instructions, when executed by the processor, may cause the electronic device to transmit, to the network via the communication circuit, an RRC connection setup complete message including an attach request message for registering with the network before transmitting the UCI message.

According to an embodiment of the disclosure, the instructions, when executed by the processor, may cause the electronic device to, based on identifying that the version number of the TS release operated in the electronic device is different from the version number of the TS release operated in the network, change the TS release operated in the electronic device to another TS release with another version number.

According to an embodiment of the disclosure, the instructions, when executed by the processor, may cause the electronic device to establish another RRC connection with the network via the communication circuit based on the other TS release.

According to an embodiment of the disclosure, the instructions, when executed by the processor, may cause the electronic device to transmit, to the network via the communication circuit, another RRC connection setup complete message including another attach request message which is based on the other TS release.

According to an embodiment of the disclosure, the instructions, when executed by the processor, may cause the electronic device to, based on transmission of the other RRC connection setup complete message, receive another UCE message which is based on the other TS release from the network via the communication circuit.

According to an embodiment of the disclosure, the instructions, when executed by the processor, may cause the electronic device to, in response to the other UCE message, transmit another UCI message which is based on the other TS release to the network via the communication circuit.

According to an embodiment of the disclosure, the instructions, when executed by the processor, may cause the electronic device to, based on transmission of the other UCI message, receive an RRC connection reconfiguration message including an attach accept message which is based on the other TS release from the network via the communication circuit.

According to an embodiment of the disclosure, the instructions, when executed by the processor, may cause the electronic device to establish the RRC connection with the network via the communication circuit before transmitting the UCI message.

According to an embodiment of the disclosure, the instructions, when executed by the processor, may cause the electronic device to transmit a uplink (UL) information transfer message including a tracking area update (TAU)

request message for updating a tracking area to the network via the communication circuit before transmitting the UCI message.

According to an embodiment of the disclosure, the instructions, when executed by the processor, may cause the electronic device to, based on identifying that the version number of the TS release operated in the electronic device is different from the version number of the TS release operated in the network, change the TS release operated in the electronic device to another TS release with another version number.

According to an embodiment of the disclosure, the instructions, when executed by the processor, may cause the electronic device to establish another RRC connection with the network via the communication circuit based on the other TS release.

According to an embodiment of the disclosure, the instructions, when executed by the processor, may cause the electronic device to transmit another UL information transfer message including another TAU request message which is based on the other TS release to the network via the communication circuit.

According to an embodiment of the disclosure, the instructions, when executed by the processor, may cause the electronic device to, based on transmission of the other UL information transfer message, receive another UCE message which is based on the other TS release from the network via the communication circuit.

According to an embodiment of the disclosure, the instructions, when executed by the processor, may cause the electronic device to, in response to the other UCE message, transmit another UCI message which is based on the other TS release to the network via the communication circuit.

According to an embodiment of the disclosure, the instructions, when executed by the processor, may cause the electronic device to, based on transmission of the other UCI message, receive a downlink (DL) information transfer message including a TAU accept message which is based on the other TS release from the network via the communication circuit.

According to an embodiment of the disclosure, an electronic device (e.g., an electronic device 101 in FIG. 1, 2A, 2B, 3A, 3B, or 3C) may include a communication circuit (e.g., a communication module 190 in FIG. 1), a processor (e.g., the processor 120 in FIG. 1, the first communication processor 212 or a second communication processor 214 in FIG. 2A, or an integrated communication processor 260 in FIG. 2B), and memory (e.g., the memory 130 in FIG. 1) storing instructions.

According to an embodiment of the disclosure, the instructions, when executed by the processor, may cause the electronic device to receive, from a network (e.g., an MN 310 or an SN 320 in FIG. 3A, an NR base station 350 in FIG. 3B, an LTE base station 340 or an NR base station 350 in FIG. 3C, or an external electronic device 400 in FIG. 4) via the communication circuit, a message including information related to a version number of a technical specification (TS) release operated in the network.

According to an embodiment of the disclosure, the instructions, when executed by the processor, may cause the electronic device to, based on the information related to the version number of the TS release operated in the network, identify that a version number of a TS release operated in the electronic device is different from the version number of the TS release operated in the network.

According to an embodiment of the disclosure, the instructions, when executed by the processor, may cause the electronic device to, based on identifying that the version number of the TS release operated in the electronic device is different from the version number of the TS release operated in the network, change the TS release operated in the electronic device to another TS release with another version number.

According to an embodiment of the disclosure, the instructions, when executed by the processor, may cause the electronic device to receive a user equipment (UE) capability enquiry (UCE) message requesting to transfer capability information of the electronic device which is based on the other TS release from the network via the communication circuit.

According to an embodiment of the disclosure, the instructions, when executed by the processor, may cause the electronic device to, in response to the UCE message, transmit a UE capability information (UCI) message including the capability information of the electronic device which is based on the other TS release to the network via the communication circuit.

According to an embodiment of the disclosure, the instructions, when executed by the processor, may cause the electronic device to establish a radio resource control (RRC) connection with the network via the communication circuit based on the other TS release before transmitting the UCI message.

According to an embodiment of the disclosure, the instructions, when executed by the processor, may cause the electronic device to transmit, to the network via the communication circuit, one of an RRC connection setup complete message including an attach request message for registering with the network which is based on the other TS release, or a uplink (UL) information transfer message including a tracking area update (TAU) request message for updating a tracking area which is based on the other TS release before transmitting the UCI message.

According to an embodiment of the disclosure, the instructions, when executed by the processor, may cause the electronic device to, based on transmission of the UCI message, receive a response message to the one of the RRC connection setup complete message or the UL information transfer message from the network via the communication circuit.

According to an embodiment of the disclosure, a response message to the RRC connection setup complete message may include an RRC connection reconfiguration message including an attach accept message which is based on the other TS release.

According to an embodiment of the disclosure, a response message to the UL information transfer message may include a downlink (DL) information transfer message including a TAU accept message which is based on the other TS release.

Figure 5:
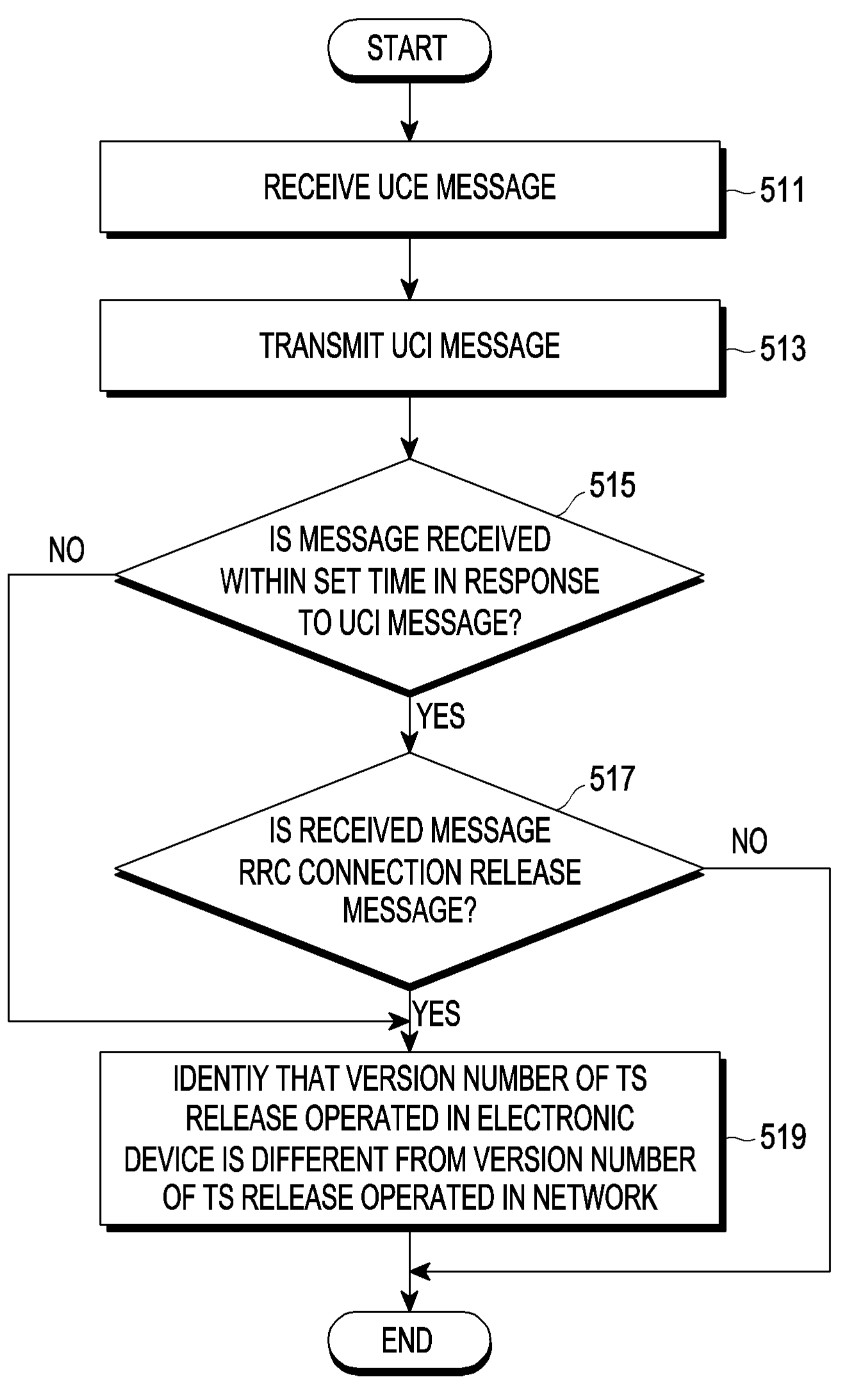
FIG. 5 is a flowchart illustrating an operating method of an electronic device according to an embodiment of the disclosure.

FIG. 5 is a flowchart illustrating an operating method of an electronic device according to an embodiment of the disclosure.

Referring to FIG. 5, an electronic device (e.g., an electronic device 101 in FIG. 1, 2A, 2B, 3A, 3B, or 3C) (e.g., the processor 120 in FIG. 1, the first communication processor 212 or a second communication processor 214 in FIG. 2A, or an integrated communication processor 260 in FIG. 2B) may receive a user equipment (UE) capability enquiry (UCE) message requesting to transfer capability information of the electronic device from a network (e.g., an MN 310 or an SN 320 in FIG. 3A, an NR base station 350 in FIG. 3B, an LTE base station 340 or an NR base station 350 in FIG. 3C, or an external electronic device 400 in FIG. 4) via a communication circuit (e.g., a communication module 190 in FIG. 1) in operation 511. According to an embodiment of the disclosure, the UCE message may be used to request transmission of capability information related to a radio access capability of the electronic device (e.g., a UE) in a network (e.g., an eNodeB).

In response to the UCE message, the electronic device may transmit a UE capability information (UCI) message including the capability information of the electronic device to the network via the communication circuit in operation 513. In an embodiment of the disclosure, the UCI message may include an RRC-TransactionIdentifier information element (IE) used for identification of a radio resource control (RRC) procedure (or transaction), and/or a UE capability information IE. In an embodiment of the disclosure, the UE capability information IE may include a UE-CapabilityRAT-ContainerList including a list of containers for each radio access technology (RAT) in which UE capabilities are transferred. In an embodiment of the disclosure, the capability information of the electronic device included in the UCI message may further include other IEs as well as the RRC-TransactionIdentifier and/or the UE capability information IE, and the capability information of the electronic device included in the UCI message may be prescribed by a technical specification (TS) release (e.g., a 3rd generation partnership project (3GPP) TS release) operated in the electronic device. The 3GPP TS release may varied according to ongoing research by a technical specification group (TSG), and may change after formal TSG approval. The 3GPP TS release may have a unique version number. Referring to FIG. 5, it will be assumed that a version number of the 3GPP TS release operated in the electronic device is "16", and the 3GPP TS release of version number 16 will be referred to as "3GPP TS Release 16".

In operation 515, in response to the UCI message, the electronic device may identify whether a message is received from the network via the communication circuit within a set time. In an embodiment of the disclosure, the set time may be set by the electronic device and/or the network.

When identifying that the message is received within the set time in response to the UCI message (Operation 515—Yes), the electronic device may identify that the received message is an RRC connection release message indicating to release an RRC connection in operation 517. In an embodiment of the disclosure, the RRC connection release message may be transmitted from the network to the electronic device if the network identifies that the version number of the TS release operated in the electronic device and a version number of a TS release (e.g., a 3GPP TS release) operated in the network are different. Referring to FIG. 5, it will be assumed that the version number of the 3GPP TS release operated in the network is "15", and the 3GPP TS release of version number 15 will be referred to as "3GPP TS Release 15".

When identifying that the message received within the set time is the RRC connection release message (Operation 517—Yes), the electronic device may identify that the version number of the TS release operated in the electronic device is different from the version number of the TS release operated in the network in operation 519. When identifying that the message received within the set time is not the RRC connection release message (Operation 517—No), the electronic device may terminate operation thereof without performing any further operations.

When identifying that the message is not received within the set time in response to the UCI message in operation 515 (Operation 515—No), the electronic device may perform operation 519. In an embodiment of the disclosure, if the network identifies that the version number of the TS release operated in the electronic device and the version number of the TS release (e.g., a 3GPP TS release) operated in the network are different, the network may transmit an RRC connection release message, however, unlike this, the network may release the RRC connection without transmitting any message to the electronic device. So, when identifying that the message is not received within the set time, the electronic device may identify that the version number of the TS release operated in the electronic device is different from the version number of the TS release operated in the network in operation 519.

Figure 6:
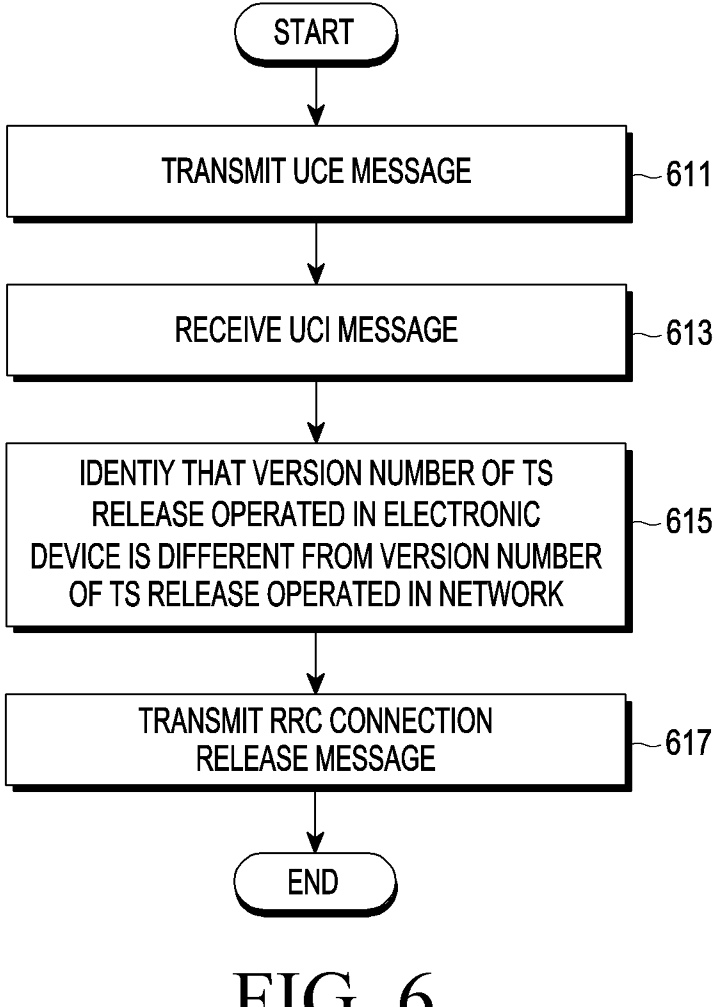
FIG. 6 is a flowchart illustrating an operating method of a network according to an embodiment of the disclosure.

FIG. 6 is a flowchart illustrating an operating method of a network according to an embodiment of the disclosure.

Referring to FIG. 6, a network (e.g., an MN 310 or an SN 320 in FIG. 3A, an NR base station 350 in FIG. 3B, an LTE base station 340 or an NR base station 350 in FIG. 3C, or an external electronic device 400 in FIG. 4) (e.g., a controller/processor 425 in FIG. 4) may transmit, to an electronic device (e.g., an electronic device 101 in FIG. 1, 2A, 2B, 3A, 3B, or 3C) via a communication circuit (e.g., a TX processing circuit 415 and a plurality of RF transceivers 410*a*-410*n* in FIG. 4), a UCE message requesting to transmit capability information of the electronic device in operation 611. According to an embodiment of the disclosure, the UCE message may be used to request transmission of the capability information related to a radio access capability of the electronic device (e.g., a UE) in the network (e.g., an eNodeB).

In operation 613, the network may receive a UCI message including the capability information of the electronic device from the electronic device via the communication circuit in response to the UCE message. In an embodiment of the disclosure, the UCI message may include an RRC-TransactionIdentifier IE used for identification of an RRC procedure (or transaction), and/or a UE capability information IE. The UE capability information IE may be implemented similarly to or substantially the same as that described in FIG. 5, so a detailed description thereof will be omitted herein. In an embodiment of the disclosure, the capability information of the electronic device included in the UCI message may further include other IEs as well as the RRC-Transaction-Identifier and/or the UE capability information IE, and the capability information of the electronic device included in the UCI message may be prescribed by a TS release (e.g., a 3GPP TS release) operated in the electronic device. Referring to FIG. 6, it will be assumed that a version number of the 3GPP TS release operated in the electronic device is "16".

In operation 615, the network may identify, based on the UCI message, the version number of the TS release operated in the electronic device, and identify that the version number of the TS release operated in the electronic device is different from a version number of a TS release (e.g., a 3GPP TS release) operated in the network. Referring to FIG. 6, it will be assumed that the version number of the 3GPP TS release operated in the network is "15".

When identifying that the version number of the TS release operated in the electronic device is different from the version number of the TS release operated in the network, the network may transmit an RRC connection release message indicating to release an RRC connection to the electronic device via the communication circuit in operation 617.

Referring to FIG. 6, a case where the network transmits the RRC connection release message to the electronic device when the network identifies that the version number of the TS release operated in the electronic device and the version number of the TS release operated in the network are different has been described. However, unlike this, when identifying that the version number of the TS release operated in the electronic device and the version number of the TS release operated in the network are different, the network may also release the RRC connection without transmitting any message to the electronic device.

Figure 7A:
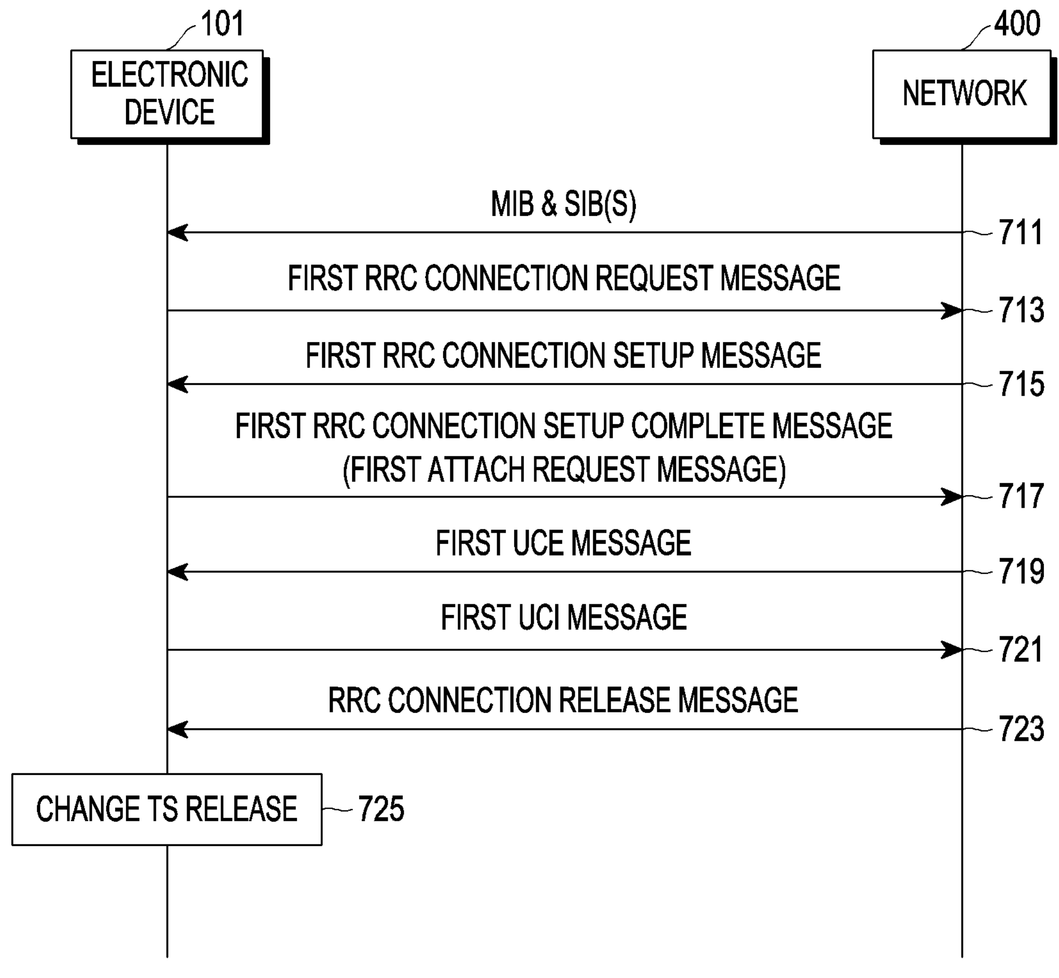
FIG. 7A is a signal flow illustrating an attach procedure in a wireless communication system according to an embodiment of the disclosure.

FIG. 7A is a signal flow illustrating an attach procedure in a wireless communication system according to an embodiment of the disclosure.

Figure 7B:
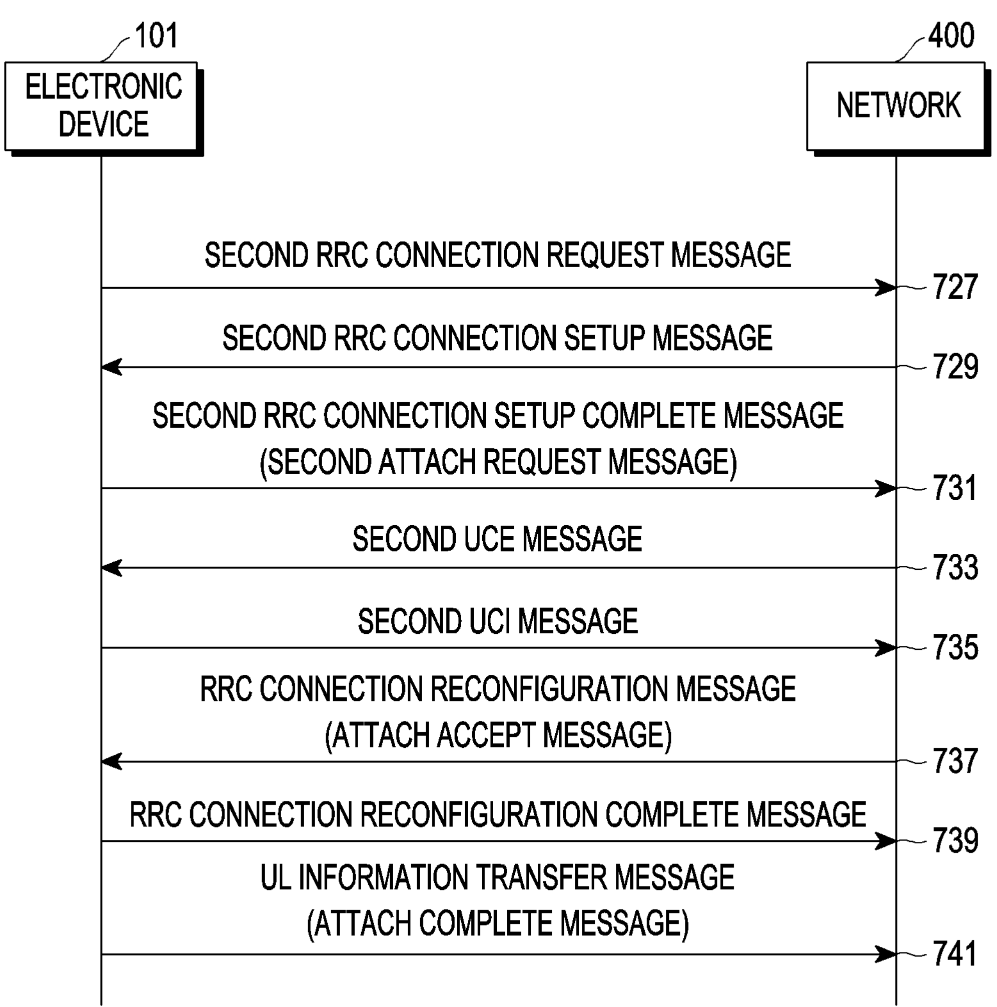
FIG. 7B is a signal flow illustrating an attach procedure in a wireless communication system according to an embodiment of the disclosure.

FIG. 7B is a signal flow illustrating an attach procedure in a wireless communication system according to an embodiment of the disclosure.

Referring to FIGS. 7A and 7B, an electronic device 101 (e.g., an electronic device 101 in FIG. 1, 2A, 2B, 3A, 3B, or 3C) may perform an attach procedure for registering with a network 400 (e.g., an MN 310 or an SN 320 in FIG. 3A, an NR base station 350 in FIG. 3B, an LTE base station 340 or an NR base station 350 in FIG. 3C, or an external electronic device 400 in FIG. 4). According to an embodiment of the disclosure, a registration procedure for the network 400 may include the attach procedure for the network 400.

In operation 711, the electronic device 101 may receive a master information block (MIB) and a system information block (SIB)(s)(e.g., a system information block type 1 (SIB1)) from the network 400. In an embodiment of the disclosure, the MIB and the SIB1 may be transmitted via broadcast signaling. For example, the MIB and the SIB1 may be transmitted on a broadcast channel (BCH). In an embodiment of the disclosure, it will be assumed that a TS release operated in the electronic device 101 is a 3GPP TS release 16 at time of initiating the attach procedure (for example, in operation 711).

When receiving the MIB and the SIB(s) from the network 400, the electronic device 101 may transmit a first RRC connection request message for requesting establishment of an RRC connection to the network 400 in operation 713. Upon receiving the first RRC connection request message from the electronic device 101, the network 400 may transmit an RRC connection setup message to the electronic device 101 in response to the first RRC connection request message in operation 715.

As the first RRC connection setup message is received from the network 400 to the electronic device 101, a first RRC connection may be established between the electronic device 101 and the network 400. Based on the establishment of the first RRC connection, the electronic device 101 may transmit a first RRC connection setup complete message for confirming successful completion of the first RRC connection establishment in operation 717. In an embodiment of the disclosure, the first RRC connection setup complete message may include a first attach request message which is a non-access stratum (NAS) message.

When receiving the first RRC connection setup completion message from the electronic device 101, the network 400 may identify that an attach to the network 400 is requested from the electronic device 101, and transmit, to the electronic device 101, a first UCE message requesting transmission of capability information of the electronic device 101 in operation 719. According to an embodiment of the disclosure, the first UCE message may be used to request transmission of the capability information related to a radio access capability of the electronic device 101 (e.g., a UE) in the network 400 (e.g., an eNodeB).

When receiving the first UCE message from the network 400, the electronic device 101 may transmit a first UCI message including the capability information of the electronic device 101 to the network 400 in response to the first UCE message in operation 721. In an embodiment of the disclosure, the first UCI message may include an RRC-TransactionIdentifier IE used for identification of an RRC procedure (or transaction) and/or a UE capability information IE. In an embodiment of the disclosure, the UE capability information IE may include a UE-CapabilityRAT-ContainerList including a list of containers for each RAT in which UE capabilities are transferred. In an embodiment of the disclosure, the capability information of the electronic device 101 included in the first UCI message may further include other IEs as well as the RRC-TransactionIdentifier and/or the UE capability information IE, and the capability information of the electronic device 101 included in the first UCI message may be prescribed by a TS release (e.g., a 3GPP TS release) operated in the electronic device 101.

When receiving the first UCI message from the electronic device 101, the network 400 may identify a version number of a TS release operated in the electronic device 101 based on the first UCI message, and may identify that the version number of the TS release operated in the electronic device 101 is different from a version number of a TS release (e.g., a 3GPP TS release) operated in the network 400. Referring to FIGS. 7A and 7B, it will be assumed that the version number of the 3GPP TS release operated in the network 400 is "15". When identifying that the version number of the TS release operated in the electronic device 101 is different from the version number of the TS release operated in the network 400, the network 400 may transmit an RRC connection release message indicating to release an RRC connection to the electronic device 101 in operation 723. Referring to FIGS. 7A and 7B, a case in which the network 400 transmits the RRC connection release message to the electronic device 101 if the network 400 identifies that the version number of the TS release operated in the electronic device 101 and the version number of the TS release operated in the network 400 are different has been described. However, unlike this, when identifying that the version number of the TS release operated in the electronic device 101 and the version number of the TS release operated in the network 400 are different, the network 400 may release the RRC connection without transmitting any message.

When receiving the RRC connection release message from the network 400, the electronic device 101 may identify that the version number of the TS release operated in the electronic device 101 is different from the version of the TS release operated in the network 400 in operation 725. When identifying that the version number of the TS release operated in the electronic device 101 is different from the version of the TS release operated in the network 400, the electronic device 101 may change the TS release operated in the electronic device 101 to another TS release with another version number in operation 725. In an embodiment of the disclosure, when receiving the RRC connection release message from the network 400, the electronic device 101 may identify that the version number (e.g., "16") of the TS release operated in the electronic device 101 is higher than the version number (e.g., "15") of the TS release operated in the electronic device 101, so the electronic device 101 may change (for example, downgrade) the TS release (e.g., a 3GPP TS release 16) operated in the electronic device 101 to a TS release with a low version number (e.g., a 3GPP TS release 15).

When changing the TS release operated in the electronic device 101 to another TS release with another version number, the electronic device 101 may need to establish an RRC connection with the network 400 again as an RRC connection between the electronic device 101 and the network 400 is released. So, the electronic device 101 may transmit a second RRC connection request message requesting establishment of an RRC connection which is based on the other TS release to the network 400 in operation 727. According to an embodiment of the disclosure, the first RRC connection request message in operation 713 may be based on the TS release 16, but the second RRC connection request message in operation 727 may be based on the TS release 15.

When receiving the second RRC connection request message from the electronic device 101, the network 400 may transmit a second RRC connection setup message to the electronic device 101 in response to the second RRC connection request message in operation 729.

As the second RRC connection setup message is received from the network 400 to the electronic device 101, a second RRC connection may be established between the electronic device 101 and the network 400. In an embodiment of the disclosure, the second RRC connection may be based on the other TS release. Based on the establishment of the second RRC connection, the electronic device 101 may transmit a second RRC connection setup completion message for confirming successful completion of the second RRC connection establishment which is based on the other TS release in operation 731. In an embodiment of the disclosure, the second RRC connection setup complete message may include a second attach request message which is a NAS message. According to an embodiment of the disclosure, the first RRC connection setup complete message in operation 717 may be based on the TS release 16, but the second RRC connection setup complete message in operation 731 may be based on the TS release 15.

When receiving the second RRC connection setup complete message from the electronic device 101, the network 400 may transmit a second UCE message requesting to transmit capability information of the electronic device 101 to the electronic device 101 in operation 733.

When receiving the second UCE message from the network 400, the electronic device 101 may transmit a second UCI message including the capability information of the electronic device 101 to the network 400 in response to the second UCE message in operation 735. In an embodiment of the disclosure, the second UCI message may include an RRC-TransactionIdentifier IE used for identification of an RRC procedure (or transaction) and/or a UE capability information IE. In an embodiment of the disclosure, the UE capability information IE may include a UE-CapabilityRAT-ContainerList including a list of containers for each RAT in which UE capabilities are transferred. In an embodiment of the disclosure, the capability information of the electronic device 101 included in the second UCI message may further include other IEs as well as the RRC-TransactionIdentifier and/or the UE capability information IE, and the capability information of the electronic device 101 included in the second UCI message may be prescribed by a TS release (e.g., a 3GPP TS release) operated in the electronic device 101. So, the capability information of the electronic device 101 included in the first UCI message in operation 721 may be different from the capability information of the electronic device 101 included in the second UCI message in operation 735. According to an embodiment of the disclosure, the first UCI message in operation 721 may be based on the TS release 16, but the second UCI message in operation 735 may be based on the TS release 15.

When receiving the second UCI message from the electronic device 101, the network 400 may identify the version number of the TS release operated in the electronic device 101 based on the second UCI, and may identify that the version number of the TS release operated in the electronic device 101 is equal to the version number of the TS release operated in the network 400. As the electronic device 101 changes the TS release operated in the electronic device 101 to the other TS release (e.g., the TS release operated in the network 400) in operation 725, the version number of the TS release operated in the electronic device 101 may be equal to the version number of the TS release operated in the network 400. When identifying that the version number of the TS release operated in the electronic device 101 is identical to the version number of the TS release operated in the network 400, the network 400 may transmit an RRC connection reconfiguration message for modifying an RRC connection to the electronic device 101 in operation 737.

In an embodiment of the disclosure, the RRC connection reconfiguration message may include a measurement configuration, mobility control, conditional reconfigurations (conditional handover), and information about a radio resource configuration. In an embodiment of the disclosure, the information about the radio resource configuration may include associated dedicated NAS information and a security configuration. In an embodiment of the disclosure, the information about the radio resource configuration may include resource blocks (RBs), medium access control (MAC) main information, and a physical channel configuration. In an embodiment of the disclosure, the RRC connection reconfiguration message may include an attach accept message which is a response message to the second attach request message and which is a NAS message.

When receiving the RRC connection reconfiguration message from the network 400, the electronic device 101 may identify the attach accept message included in the RRC connection reconfiguration message, so the electronic device 101 may identify that an attachment to the network 400 by the electronic device 101 is successful. As such, if the attachment to the network 400 is successful by changing the version number of the TS release, the electronic device 101 may identify that the version number of the TS release operated in the network 400 is different from the version number of the TS release operated in the electronic device 101. In this case, the electronic device 101 may include, into a release list, information about the network 400 which is operated with the TS release with the version number different from the version number of the TS release operated in the electronic device 101.

According to an embodiment of the disclosure, the release list may be implemented in a form of a lower release list. If the electronic device 101 downgrades to a TS release with a lower version number than the version number of the TS release operated in the electronic device 101, and an attachment to the network 400 is successful based on the downgraded TS release, the electronic device 101 may identify that the version number of the TS release operated in the network 400 is lower than the version number of the TS release operated in the electronic device 101, and include, into the release list, information about the network 400 which is operated with the TS release with the version number lower than the version number of the TS release operated in the electronic device 101.

According to an embodiment of the disclosure, the lower release list may be implemented as shown in Table 2 below.

TABLE 2

| Lower Release List | | | | | | |
|---|---|---|---|---|---|---|
| Index | MCC-MNC | ECI (28 bits) | PCI (0~503) | EARFCN | Release Ver. | Count |
| 1 | 311-480 | 0x000D216 | 302 | 5310 | 15 | 10 |
| 2 | 310-090 | 0x000C176 | 263 | 2560 | 14 | 7 |
| 3 | . . . | . . . | . . . | . . . | . . . | . . . |
| . . . | . . . | . . . | . . . | . . . | . . . | . . . |
| N | . . . | . . . | . . . | . . . | . . . | . . . |

In Table 2, Index represents a network index, MCC represents a mobile country code, MNC represents a mobile network code, ECI represents an E-UTRAN cell identifier, PCI represents a physical cell identifier, and EARFCN represents an E-UTRA absolute radio frequency channel number. In Table 2, Release Ver. represents a version number of a TS release, Count may be set to a first value (e.g., "10") when a corresponding network is first registered with the lower release list, and a value of Count may be decreased or increased by a set value (e.g., "1") whenever the electronic device 101 is registered with the corresponding network. In an embodiment of the disclosure, if the value of Count is decreased by the set value whenever the electronic device 101 is registered with the corresponding network, the electronic device 101 may manage the lower release list by deleting information about the corresponding network from the lower release list if the value of Count is a second value (e.g., "0").

In Table 2, a case in which a value of Count may be set to the first value (e.g., "10") when the corresponding network is first registered with the lower release list, the value of Count may be decreased by the set value whenever the electronic device 101 is registered with the corresponding network, and the electronic device 101 manages the lower release list by deleting information about the corresponding network from the lower release list if the value of Count is the second value (e.g., "0") has been described as an example.

Unlike this, a value of Count may be set to the second value (e.g., "0") when the corresponding network is first registered with the lower release list, the value of Count may be increased by the set value (e.g., "1") whenever the electronic device 101 is registered with the corresponding network, and the electronic device 101 may also manage the lower release list by deleting information about the corresponding network from the lower release list if the value of Count is the first value (e.g., "10") has been described as an example.

In operation 737, a case in which the electronic device 101 implements the release list in a form of the lower release list has been described as an example, but the release list may be implemented in a form of a higher release list including information about a network which operates a TS release with a higher version number than the version number of the TS release operated in the electronic device 101, or in a form of including information about a network which operates a TS release with a version number different from than the version number of the TS release operated in the electronic device 101 (for example, in a form of including the lower release list and the higher release list).

In operation 739, the electronic device 101 may transmit an RRC connection reconfiguration complete message to the network 400 in response to the RRC connection reconfiguration message. In an embodiment of the disclosure, the RRC connection reconfiguration complete message may be used for confirming successful completion of RRC connection reconfiguration.

After transmitting the RRC connection reconfiguration complete message, the electronic device 101 may transmit an uplink (UL) information transfer message to the network 400 in operation 741. In an embodiment of the disclosure, the UL information transfer message may include an attach complete message which is a NAS message.

Referring to FIGS. 7A and 7B, a case in which the attach procedure to the network 400 succeeds after the electronic device 101 changes the TS release operated in the electronic device 101 once from the TS release 16 to the TS release 15 has been described as an example, however, if a version number of a TS release operated in the network 400 is 14, the electronic device 101 may succeed in the attach procedure to the network 400 after changing the TS release operated in the electronic device 101 from the TS release 16 to the TS release 15, and then changes the TS release operated in the electronic device 101 from the TS release 15 to the TS release 14. According to an embodiment of the disclosure, the electronic device 101 may change the TS operated in the electronic device 101 until a TS release with the same version number as the version number of the TS release operated in the network 400 is identified regardless of the number of times.

Referring to FIGS. 7A and 7B, a case in which the electronic device 101 changes the TS release operated in the electronic device 101 from the TS release 16 to the TS release with the lower version number, such as the TS release 15, has been described as an example, however the electronic device 101 may perform the attach procedure to the network 400 by changing the version number of the TS release operated in the electronic device 101 to a higher version number.

Figure 8A:
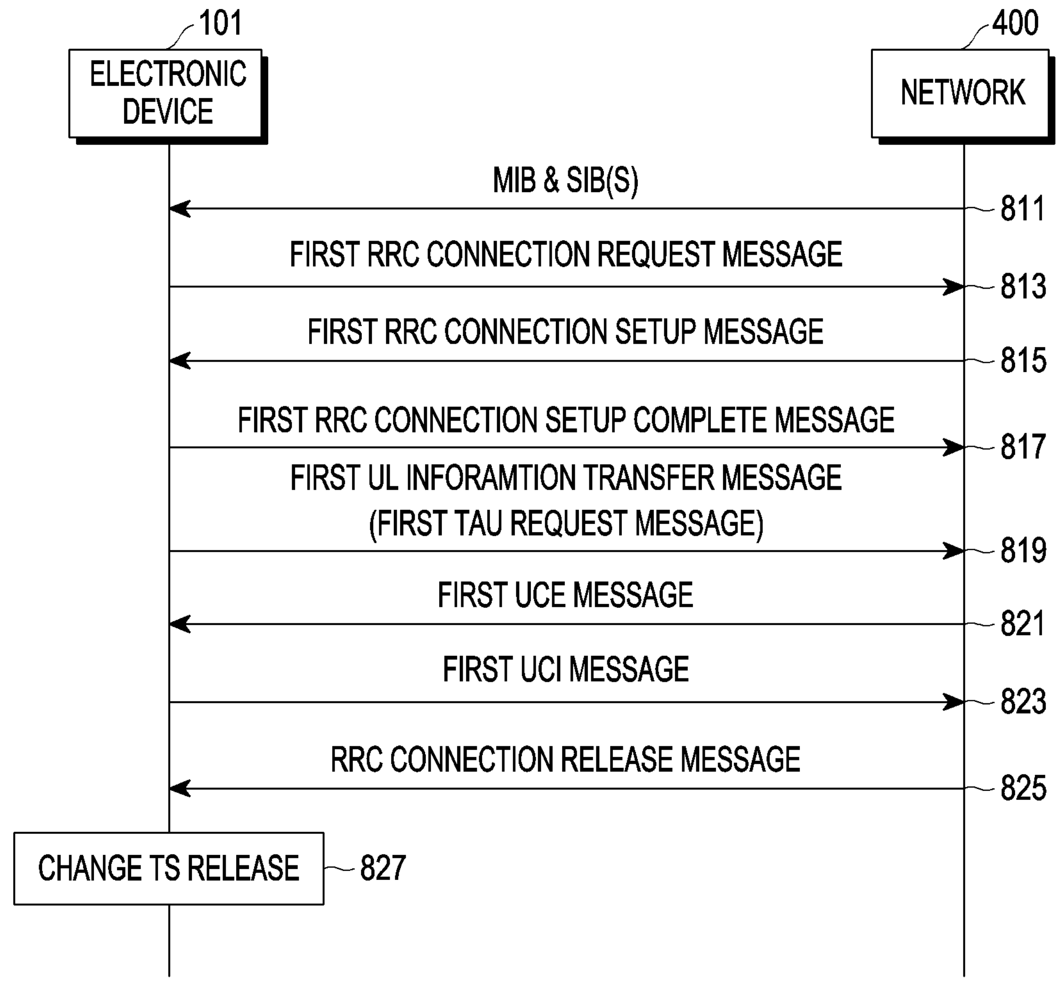
FIG. 8A is a signal flow illustrating a tracking area update (TAU) procedure in a wireless communication system according to an embodiment of the disclosure.

FIG. 8A is a signal flow illustrating a tracking area update (TAU) procedure in a wireless communication system according to an embodiment of the disclosure.

Figure 8B:
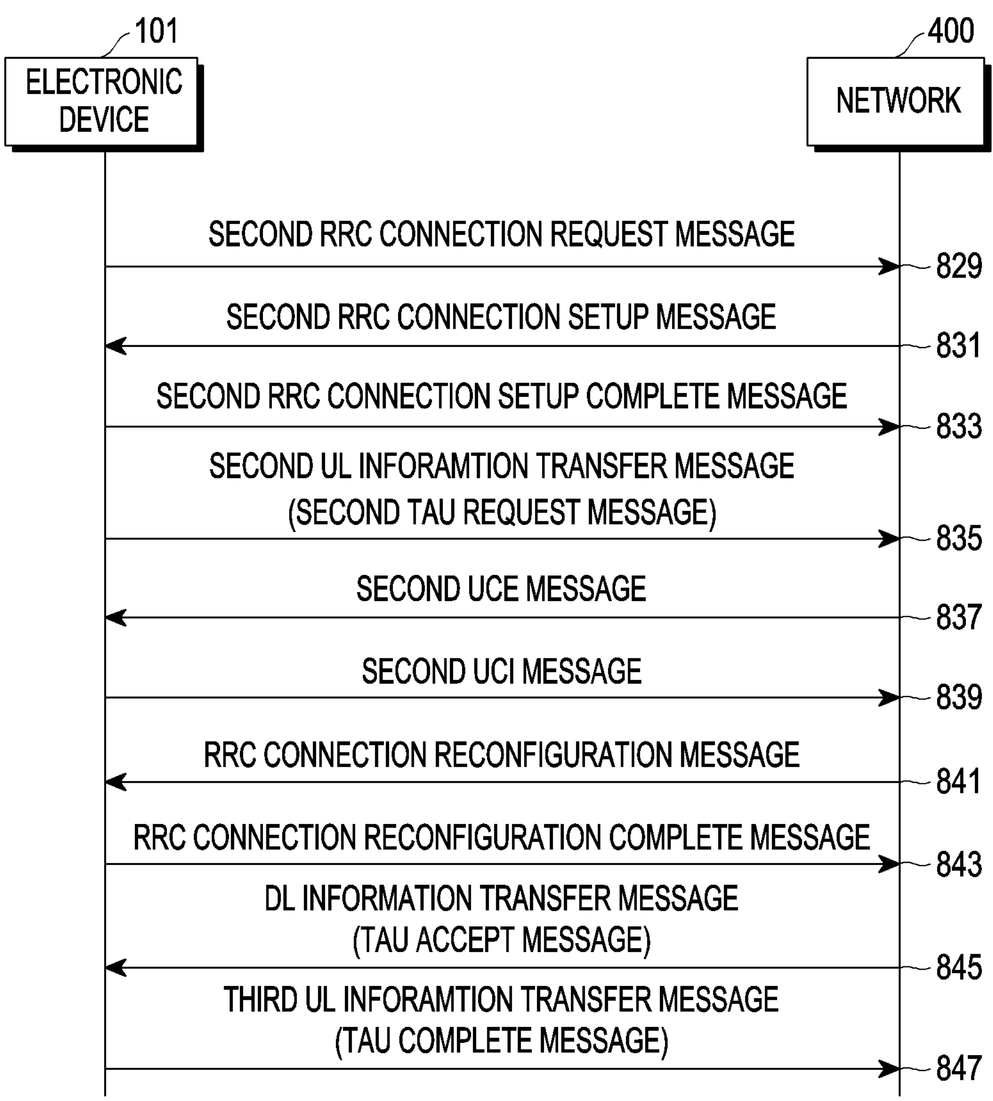
FIG. 8B is a signal flow illustrating a TAU procedure in a wireless communication system according to an embodiment of the disclosure.

FIG. 8B is a signal flow illustrating a TAU procedure in a wireless communication system according to an embodiment of the disclosure.

Referring to FIGS. 8A and 8B, an electronic device 101 (e.g., an electronic device 101 in FIG. 1, 2A, 2B, 3A, 3B, or 3C) may perform a TAU procedure with a network 400 (e.g., an MN 310 or an SN 320 in FIG. 3A, an NR base station 350 in FIG. 3B, an LTE base station 340 or an NR base station 350 in FIG. 3C, or an external electronic device 400 in FIG. 4). According to an embodiment of the disclosure, a registration procedure for the network 400 may include the TAU procedure for the network 400.

In operation 811, the electronic device 101 may receive an MIB and an SIB(s)(e.g., an SIB1) from the network 400. In an embodiment of the disclosure, the MIB and the SIB1 may be transmitted via broadcast signaling. For example, the MIB and the SIB1 may be transmitted on a BCH. In an embodiment of the disclosure, it will be assumed that a TS release operated in the electronic device 101 is a 3GPP TS release 16 at time of initiating the TAU procedure (for example, in operation 811).

When receiving the MIB and the SIB(s) from the network 400, the electronic device 101 may transmit a first RRC connection request message for requesting establishment of an RRC connection to the network 400 in operation 813. Upon receiving the first RRC connection request message from the electronic device 101, the network 400 may transmit an RRC connection setup message to the electronic device 101 in response to the first RRC connection request message in operation 815.

As the first RRC connection setup message is received from the network 400 to the electronic device 101, a first RRC connection may be established between the electronic device 101 and the network 400. Based on the establishment of the first RRC connection, the electronic device 101 may transmit a first RRC connection setup complete message for confirming successful completion of the first RRC connection establishment in operation 817.

After transmitting the first RRC connection setup complete message to the network 400, the electronic device 101 may transmit a first UL information transfer message to the network 400 in operation 819. In an embodiment of the disclosure, the first UL information transfer message may include a first TAU request message requesting a tracking area update which is a NAS message.

When receiving the first UL information transfer message from the electronic device 101, the network 400 may transmit a first UCE message requesting transfer of capability information of the electronic device 101 to the electronic device 101 in operation 821. According to an embodiment of the disclosure, the first UCE message may be used for requesting transfer of capability information related to a radio access capability of the electronic device 101 (e.g., a UE) in the network 400 (e.g., an eNodeB).

When receiving the first UCE message from the network 400, the electronic device 101 may transmit a first UCI message including the capability information of the electronic device 101 to the network 400 in response to the first UCE message in operation 823. In an embodiment of the disclosure, the first UCI message may include an RRC-TransactionIdentifier IE used for identification of an RRC procedure (or transaction) and/or a UE capability information IE. In an embodiment of the disclosure, the UE capability information IE may include a UE-CapabilityRAT-ContainerList including a list of containers for each RAT in which UE capabilities are transferred. In an embodiment of the disclosure, the capability information of the electronic device 101 included in the first UCI message may further include other IEs as well as the RRC-TransactionIdentifier and/or the UE capability information IE, and the capability information of the electronic device 101 included in the first UCI message may be prescribed by a TS release (e.g., a 3GPP TS release) operated in the electronic device 101.

When receiving the first UCI message from the electronic device 101, the network 400 may identify a version number of a TS release operated in the electronic device 101 based on the first UCI message, and may identify that the version number of the TS release operated in the electronic device 101 is different from a version number of a TS release (e.g., a 3GPP TS release) operated in the network 400. Referring to FIGS. 8A and 8B, it will be assumed that the version number of the 3GPP TS release operated in the network 400 is "15". When identifying that the version number of the TS release operated in the electronic device 101 is different from the version number of the TS release operated in the network 400, the network 400 may transmit an RRC connection release message indicating to release an RRC connection to the electronic device 101 in operation 825. Referring to FIGS. 8A and 8B, a case in which the network 400 transmits the RRC connection release message to the electronic device 101 if the network 400 identifies that the version number of the TS release operated in the electronic device 101 and the version number of the TS release operated in the network 400 are different has been described.

However, unlike this, when identifying that the version number of the TS release operated in the electronic device 101 and the version number of the TS release operated in the network 400 are different, the network 400 may release the RRC connection without transmitting any message.

When receiving the RRC connection release message from the network 400, the electronic device 101 may identify that the version number of the TS release operated in the electronic device 101 is different from the version of the TS release operated in the network 400 in operation 827. When identifying that the version number of the TS release operated in the electronic device 101 is different from the version of the TS release operated in the network 400, the electronic device 101 may change the TS release operated in the electronic device 101 to another TS release with another version number in operation 827. In an embodiment of the disclosure, when receiving the RRC connection release message from the network 400, the electronic device 101 may identify that the version number (e.g., "16") of the TS release operated in the electronic device 101 is higher than the version number (e.g., "15") of the TS release operated in the electronic device 101, so the electronic device 101 may change (for example, downgrade) the TS release (e.g., a 3GPP TS release 16) operated in the electronic device 101 to a TS release with a low version number (e.g., a 3GPP TS release 15).

When changing the TS release operated in the electronic device 101 to another TS release with another version number, the electronic device 101 may need to establish an RRC connection with the network 400 again as an RRC connection between the electronic device 101 and the network 400 is released. So, the electronic device 101 may transmit a second RRC connection request message requesting establishment of an RRC connection which is based on the other TS release to the network 400 in operation 829. According to an embodiment of the disclosure, the first RRC connection request message in operation 813 may be based on the TS release 16, but the second RRC connection request message in operation 829 may be based on the TS release 15.

When receiving the second RRC connection request message from the electronic device 101, the network 400 may transmit a second RRC connection setup message to the electronic device 101 in response to the second RRC connection request message in operation 831.

As the second RRC connection setup message is received from the network 400 to the electronic device 101, a second RRC connection may be established between the electronic device 101 and the network 400. In an embodiment of the disclosure, the second RRC connection may be based on the other TS release. Based on the establishment of the second RRC connection, the electronic device 101 may transmit a second RRC connection setup completion message for confirming successful completion of the second RRC connection establishment which is based on the other TS release in operation 833. According to an embodiment of the disclosure, the first RRC connection setup complete message in operation 817 may be based on the TS release 16, but the second RRC connection setup complete message in operation 833 may be based on the TS release 15.

After transmitting the second RRC connection setup complete message to the network 400, the electronic device 101 may transmit a second UL information transfer message to the network 400 in operation 835. In an embodiment of the disclosure, the second UL information transfer message may include a second TAU request message which is a NAS message. According to an embodiment of the disclosure, the first UL information transfer message in operation 819 may be based on the TS release 16, but the second UL information transfer message in operation 835 may be based on the TS release 15.

When receiving the second UL information transfer message from the electronic device 101, the network 400 may transmit a second UCE message requesting to transmit capability information of the electronic device 101 to the electronic device 101 in operation 837.

When receiving the second UCE message from the network 400, the electronic device 101 may transmit a second UCI message including the capability information of the electronic device 101 to the network 400 in response to the second UCE message in operation 839. In an embodiment of the disclosure, the second UCI message may include an RRC-TransactionIdentifier IE used for identification of an RRC procedure (or transaction) and/or a UE capability information IE. In an embodiment of the disclosure, the UE capability information IE may include a UE-CapabilityRAT-ContainerList including a list of containers for each RAT in which UE capabilities are transferred. In an embodiment of the disclosure, the capability information of the electronic device 101 included in the second UCI message may further include other IEs as well as the RRC-TransactionIdentifier and/or the UE capability information IE, and the capability information of the electronic device 101 included in the second UCI message may be prescribed by a TS release (e.g., a 3GPP TS release) operated in the electronic device 101. So, the capability information of the electronic device 101 included in the first UCI message in operation 823 may be different from the capability information of the electronic device 101 included in the second UCI message in operation 839. According to an embodiment of the disclosure, the first UCI message in operation 823 may be based on the TS release 16, but the second UCI message in operation 839 may be based on the TS release 15.

When receiving the second UCI message from the electronic device 101, the network 400 may identify the version number of the TS release operated in the electronic device 101 based on the second UCI, and may identify that the version number of the TS release operated in the electronic device 101 is equal to the version number of the TS release operated in the network 400. As the electronic device 101 changes the TS release operated in the electronic device 101 to the other TS release (e.g., the TS release operated in the network 400) in operation 827, the version number of the TS release operated in the electronic device 101 may be equal to the version number of the TS release operated in the network 400. When identifying that the version number of the TS release operated in the electronic device 101 is identical to the version number of the TS release operated in the network 400, the network 400 may transmit an RRC connection reconfiguration message for modifying an RRC connection to the electronic device 101 in operation 841. In an embodiment of the disclosure, the RRC connection reconfiguration message may include a measurement configuration, mobility control, conditional reconfigurations (conditional handover), and information about a radio resource configuration. In an embodiment of the disclosure, the information about the radio resource configuration may be implemented similarly to or substantially the same as that described in operation 737, so a detailed description thereof will be omitted herein.

When receiving the RRC connection reconfiguration message from the network 400, the electronic device 101 may transmit an RRC connection reconfiguration complete message to the network 400 in response to the RRC connection reconfiguration message in operation 843. In an embodiment of the disclosure, the RRC connection reconfiguration complete message may be used to confirm successful completion of RRC connection reconfiguration.

When receiving the RRC connection reconfiguration complete message from the electronic device 101, the network 400 may transmit a downlink (DL) information transfer message to the electronic device 101 in operation 845. In an embodiment of the disclosure, the DL information transfer message may include a TAU accept message which is a NAS message. In an embodiment of the disclosure, the TAU accept message may be used to indicate that a TAU request is accepted.

When receiving the DL information transfer message from the network 400, the electronic device 101 may identify the TAU accept message included in the DL information transfer message, so the electronic device 101 may identify that the attachment to the network 400 by the electronic device 101 is successful. As such, if the attachment to the network 400 is successful by changing the version number of the TS release, the electronic device 101 may identify that the version number of the TS release operated in the network 400 is different from the version number of the TS release operated in the electronic device 101. In this case, the electronic device 101 may include, into a release list (e.g., a lower release list), information about the network 400 which is operated with the TS release with the version number different from the version number of the TS release operated in the electronic device 101. The release list may be implemented similarly to or substantially the same as that described in Table 2, so a detailed description thereof will be omitted herein.

When receiving the DL information transfer message from the network 400, the electronic device 101 may identify the TAU accept message included in the DL information transfer message, so the electronic device 101 may identify that the attachment to the network 400 by the electronic device 101 is successful. So, the electronic device 101 may transmit a UL information transfer message to the network 400 in operation 847. In an embodiment of the disclosure, the UL information transfer message may include a TAU complete message which is a NAS message. In an embodiment of the disclosure, the TAU complete message may be used to confirm successful completion of the TAU procedure.

Referring to FIGS. 8A and 8B, a case in which the TAU procedure to the network 400 succeeds after the electronic device 101 changes the TS release operated in the electronic device 101 once from the TS release 16 to the TS release 15 has been described as an example, however, if a version number of a TS release operated in the network 400 is 14, the electronic device 101 may succeed in the TAU procedure to the network 400 after changing the TS release operated in the electronic device 101 from the TS release 16 to the TS release 15, and then changes the TS release operated in the electronic device 101 from the TS release 15 to the TS release 14. According to an embodiment of the disclosure, the electronic device 101 may change the TS operated in the electronic device 101 until a TS release with the same version number as the version number of the TS release operated in the network 400 is identified regardless of the number of times.

Referring to FIGS. 8A and 8B, a case in which the electronic device 101 changes the TS release operated in the electronic device 101 from the TS release 16 to the TS release with the lower version number, such as the TS release 15, has been described as an example, however the electronic device 101 may perform the TAU procedure to the network 400 by changing the version number of the TS release operated in the electronic device 101 to a higher version number.

Figure 9:
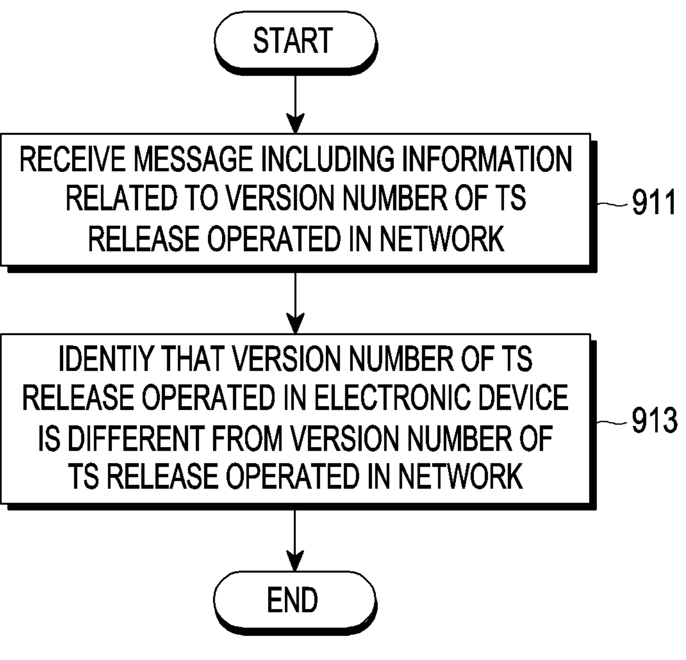
FIG. 9 is a flowchart illustrating an operating method of an electronic device according to an embodiment of the disclosure.

FIG. 9 is a flowchart illustrating an operating method of an electronic device according to an embodiment of the disclosure.

Referring to FIG. 9, an electronic device (e.g., the electronic device 101 in FIG. 1, 2A, 2B, 3A, 3B, or 3C)(e.g., the processor 120 in FIG. 1, the first communication processor 212 or a second communication processor 214 in FIG. 2A, or an integrated communication processor 260 in FIG. 2B) may receive, from a network (e.g., an MN 310 or an SN 320 in FIG. 3A, an NR base station 350 in FIG. 3B, an LTE base station 340 or an NR base station 350 in FIG. 3C, or an external electronic device 400 in FIG. 4), a message including information related to a version number of a TS release operated in the network via a communication circuit (e.g., a communication module 190 in FIG. 1) in operation 911.

According to an embodiment of the disclosure, the message including the information related to the version number of the TS release operated in the network may include a message including an SIB (e.g., a system information block type 1 message). The system information block type 1 message may include various fields, and among the various fields, fields including information related to a version number of a TS release may include a plmn-IdentityList field, a trackingAreaCode field, a cellIdentity field, a csg-Indication field, and/or a csg-Identity field.

In an embodiment of the disclosure, the plmn-IdentityList field may include a list of public land mobile network (PLMN) identities. Some of the PLMN identities which may be used in the network may be used for a first TS release (e.g., a TS release 15 (e.g., a 3GPP TS release 15)), and if PLMN identities which may be used for the first TS release is informed to the electronic device in advance, the electronic device may know that PLMN identities included in the list of PLMN identities included in the plmn-IdentityList field are for the first TS release. In an embodiment of the disclosure, the PLMN identities which may be used for the first TS release may be provided to the electronic device by the network in advance during a manufacturing process of the electronic device, a software installation process of the electronic device, or a software update process of the electronic device.

In an embodiment of the disclosure, the trackingAreaCode field may include a tracking area code which is common for all listed PLMNs. Some of tracking area codes which may be used in the network may be used for a first TS release, and if PLMN identities which may be used for the first TS release is informed to the electronic device in advance, the electronic device may know that PLMNs related to the tracking area code included in the trackingAreaCode field are for the first TS release. In an embodiment of the disclosure, the tracking area code which may be used for the first TS release may be provided to the electronic device by the network in advance during a manufacturing process of the electronic device, a software installation process of the electronic device, or a software update process of the electronic device.

In an embodiment of the disclosure, the cellIdentity field may include a cell identity capable of identifying a cell within a PLMN. Some of cell identities which may be used in the network may be used for a first TS release, and if a cell identity which may be used for the first TS release is informed to the electronic device in advance, the electronic device may know that cells related to the cell identity included in the cellIdentity field are for the first TS release. In an embodiment of the disclosure, the cell identity which may be used for the first TS release may be provided to the electronic device by the network in advance during a manufacturing process of the electronic device, a software installation process of the electronic device, or a software update process of the electronic device.

In an embodiment of the disclosure, if the csg-Indication field is set to a first value (e.g., "true"), the electronic device (e.g., a UE) may be allowed to access a cell if the cell is a closed subscriber group (CSG) cell, or if the cell is selected during manual CSG cell selection, or in order to obtain a restricted service. Some of cell identities which may be used in the network may be used for a first TS release, and if a cell identity which may be used for the first TS release is informed to the electronic device in advance, the electronic device may identify the cell identity which may be used for the first TS release based on the csg-Indication field. In an embodiment of the disclosure, the cell identity which may be used for the first TS release may be provided to the electronic device by the network in advance during a manufacturing process of the electronic device, a software installation process of the electronic device, or a software update process of the electronic device.

In an embodiment of the disclosure, the csg-Identity field may include an identity of a CSG to which a cell belongs. Some of CSGs which may be used in the network may be used for a first TS release, and if identities of CSGs which may be used for the first TS release is informed to the electronic device in advance, the electronic device may identify the CSG related to the identity of the CSG included in the csg-Identity field is for the first TS release. In an embodiment of the disclosure, the identity of the CSG which may be used for the first TS release may be provided to the electronic device by the network in advance during a manufacturing process of the electronic device, a software installation process of the electronic device, or a software update process of the electronic device.

According to an embodiment of the disclosure, a message including information related to a version number of a TS release operated in a network may include a message (e.g., a MobilityFromEUTRACommand message and/or an RRC connection reconfiguration message) which is used in a primary synchronization signal (PSS)/secondary synchronization signal (SSS) synchronization procedure. The message used in the synchronization procedure may include various fields, and the various fields may include a PhysCellId field.

In an embodiment of the disclosure, the PhysCellId field may include a physical layer identity (PhysCellId) of a cell. Some of PhysCellIds which may be used in the network may be used for a first TS release, and if PhysCellIds which may be used for the first TS release is informed to the electronic device in advance, the electronic device may identify the CSG related to the PhysCellId included in the PhysCellId field is for the first TS release. In an embodiment of the disclosure, the PhysCellId which may be used for the first TS release may be provided to the electronic device by the network in advance during a manufacturing process of the electronic device, a software installation process of the electronic device, or a software update process of the electronic device.

According to an embodiment of the disclosure, the system information block type 1 message may further include an eDRX-Allowed-5GC-r16 field, a transmissionInControlChRegion-r16 field, and/or a campingAllowedInCE-r16 field.

In an embodiment of the disclosure, presence of the eDRX-Allowed-5GC-r16 field may indicate that, for an idle mode, extended discontinuous reception (DRX) is allowed in a cell for an electronic device (e.g., a UE) connected to a 5th generation core network (5GC). The eDRX-Allowed-5GC-r16 field is supported in a second TS release (e.g., a TS release 16 (e.g., a 3GPP TS release 16)), and the electronic device may identify that a TS release operated in the network is the second TS release if the eDRX-Allowed-5GC-r16 field is included in the system information block type 1 message.

In an embodiment of the disclosure, the transmissionInControlChRegion-r16 field may indicate that an LTE control channel region may be used for DL broadcast transmission for UEs and bandwidth reduced low complexity (BL) UEs. The transmissionInControlChRegion-r16 field is supported in the second TS release, and the electronic device may identify that the TS release operated in the network is the second TS release if the system information block type 1 message includes the transmissionInControlChRegion-r16 field.

In an embodiment of the disclosure, the campingAllowedInCE-r16 field may indicate whether a non-BL UE is allowed to camp on a non-standalone BL cell in an enhanced coverage mode if an S-criterion for a normal coverage is satisfied. The campingAllowedInCE-r16 field is supported in the second TS release, and the electronic device may identify that the TS release operated in the network is the second TS release if the system information block type 1 message includes the campingAllowedInCE-r16 field.

According to an embodiment of the disclosure, a message including information related to a version of a TS release operated in a network may include a message (e.g., a system information (SI) message) including a system information block type 2 (SIB2). The SI message may include various fields, and among the various fields, fields including the information related to the version number of the TS release may include an rlos-Enabled-r16 field, an earlySecurityReactivation-r16 field, and/or an idleModeMeasurementsNR-r16 field.

In an embodiment of the disclosure, the rlos-Enabled-r16 field may indicate whether an access to restricted local operator services (RLOS) is allowed. The rlos-Enabled-r16 field is supported in the second TS release, and the electronic device may identify that the TS release operated in the network is the second TS release if the rlos-Enabled-r16 field is included in the SI message.

In an embodiment of the disclosure, if the earlySecurityReactivation-r16 field is present in the SI message, the earlySecurityReactivation-r16 field may indicate that early security reactivation is supported if a suspended RRC connection is resumed. The earlySecurityReactivation-r16 field is supported in the second TS release, and the electronic device may identify that the TS release operated in the network is the second TS release if the earlySecurityReactivation-r16 field is included in the SI message.

In an embodiment of the disclosure, the idleModeMeasurementsNR-r16 field may indicate that a UE configured for NR idle/inactive measurements will perform measurements when camping on a corresponding cell, and will report availability of measurements when establishing or resuming a connection in the corresponding cell. If the idleModeMeasurementsNR-r16 field is not present in the SI message, the UE may not be required to perform the NR idle/inactive measurements. The idleModeMeasurementsNR-r16 field is supported in the second TS release, and the electronic device may identify that the TS release operated in the network is the second TS release if the SI message includes the idleModeMeasurementsNR-r16 field.

According to an embodiment of the disclosure, a message including information related to a version of a TS release operated in a network may include a UCE message. The UCE message may include various fields, and among the various fields, fields including the information related to the version of the TS release may include an rrc-SegAllowed-r16 field.

In an embodiment of the disclosure, the rrc-SegAllowed-r16 field may be a one-shot field indicating that an electronic device (e.g., a UE) may segment a response message into a series of ULDedicatedMessageSegment messages. The rrc-SegAllowed-r16 field is supported in the second TS release, and the electronic device may identify that the TS release operated in the network is the second TS release if the rrc-SegAllowed-r16 field is included in the UCE message.

When the message including the information related to the version number of the TS release operated in the network, the electronic device may identify that the version number of the TS release in the electronic device is different from the version number of the TS release operated in the network based on the information related to the version number of the TS release operated in the network in operation 913. In an embodiment of the disclosure, the electronic device may identify that the version number (e.g., "16") of the TS release operated in the electronic device is different from the version number (e.g., "15") of the TS release operated in the network, so the electronic device may change (for example, downgrade) the TS release (e.g., a 3GPP TS release 16) operated in the electronic device to a TS release (e.g., a 3GPP TS release 15) with another version number.

Figure 10:
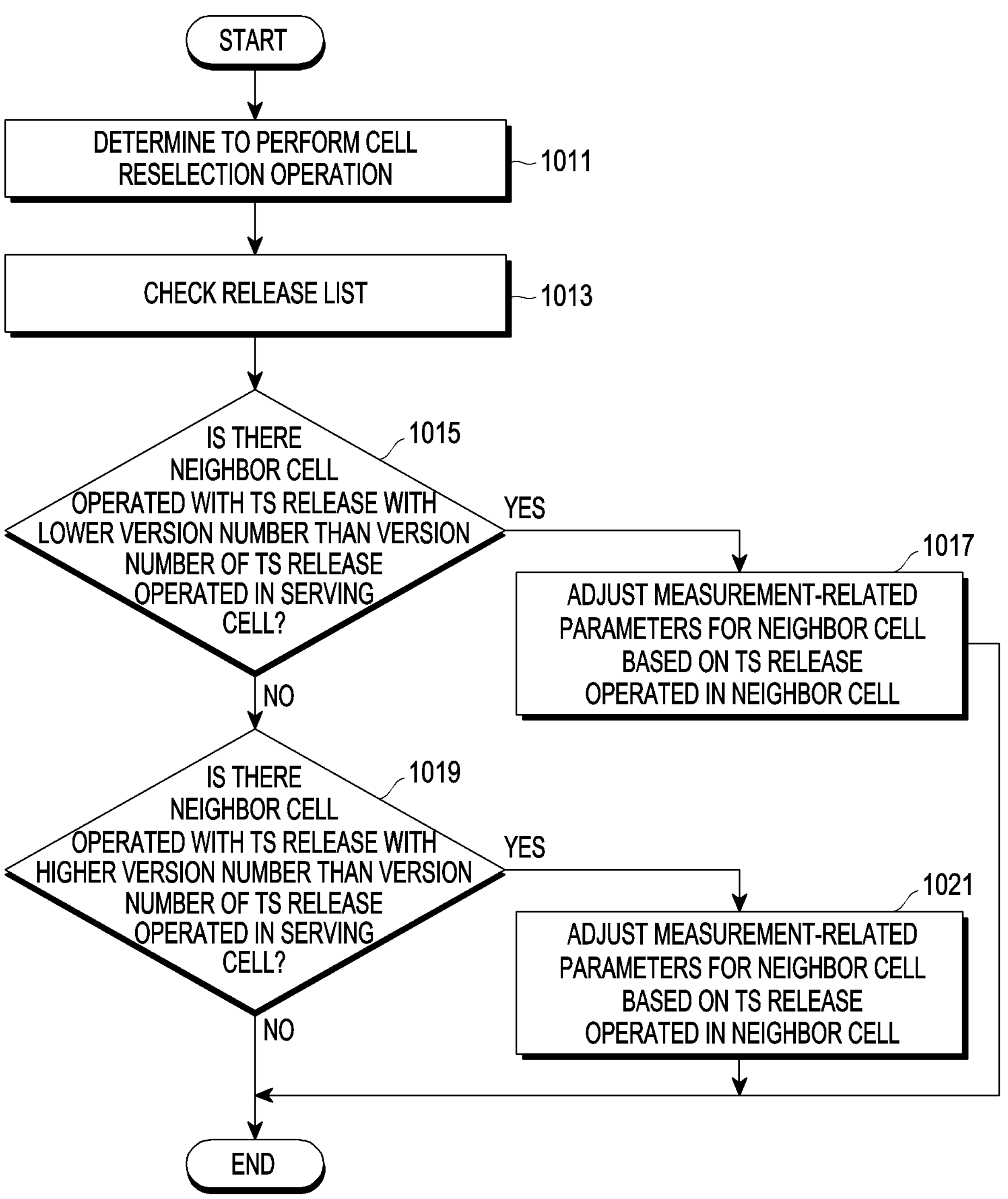
FIG. 10 is a flowchart illustrating an operating method of an electronic device according to an embodiment of the disclosure.

FIG. 10 is a flowchart illustrating an operating method of an electronic device according to an embodiment of the disclosure.

Referring to FIG. 10, an electronic device (e.g., an electronic device 101 in FIG. 1, 2A, 2B, 3A, 3B, or 3C) (e.g., the processor 120 in FIG. 1, the first communication processor 212 or a second communication processor 214 in FIG. 2A, or an integrated communication processor 260 in FIG. 2B) may determine to perform a cell reselection operation in operation 1011. In an embodiment of the disclosure, the electronic device may determine to perform the cell reselection operation when identifying that a set condition is satisfied.

When determining to perform the cell reselection operation, the electronic device needs to perform a measurement operation on neighboring cells, and may check a release list in operation 1013. When checking the release list, the electronic device may identify whether there is a neighbor cell operated with a TS release with a lower version number than a version number of a TS release (e.g., a 3GPP TS release) operated in a serving cell to which the electronic device is currently attached in operation 1015. In an embodiment of the disclosure, a version number of a TS release currently operated in the electronic device is the same as the version number of the TS release operated in the serving cell, but a version number of a TS release supportable in the electronic device may be higher than the version number of the TS release operated in the serving cell. The reason may be that the electronic device may downgrade the version number of the TS release operated in the electronic device, as described in FIGS. 7A and 7B or FIGS. 8A and 8B.

If there is the neighbor cell which is operated with the TS release with the lower version number than the version number of the TS release operated in the serving cell (Operation 1015—Yes), the electronic device may adjust measurement-related parameters for the neighbor cell operated with the TS release with the lower version number than the version number of the TS release operated in the serving cell based on the TS release operated in the neighbor cell in operation 1017. In this way, the electronic device may decrease a case of reselection of the neighbor cell operated with the TS release with the lower version number than the version number of the TS release operated in the serving cell by adjusting the measurement-related parameters for the neighbor cell operated with the TS release with the lower version number than the version number of the TS release operated in the serving cell based on the TS release operated in the neighbor cell.

In an embodiment of the disclosure, the measurement-related parameters may include cellReselectionPriority, t-ReselectionEUTRA, threshX-High, threshX-Low, and/or q-OffsetFreq.

In an embodiment of the disclosure, the cellReselection-Priority may be related to a priority between E-UTRA absolute radio frequency channel numbers (EARFCNs) of LTE cells.

In an embodiment of the disclosure, the t-ReselectionEU-TRA may be related to a cell reselection timer for a target LTE cell.

In an embodiment of the disclosure, the threshX-High may indicate a reception level threshold for a higher priority EARFCN. In an embodiment of the disclosure, the threshX-Low may indicate a reception level threshold for a low priority EARFCN.

In an embodiment of the disclosure, the q-OffsetFreq may indicate a reception level offset for a specific EARFCN to be applied when evaluating candidates for cell reselection.

In operation 1015, if there is no neighbor cell which is operated with the TS release with the lower version number than the version number of the TS release operated in the serving cell (Operation 1015—No), the electronic device may identify whether there is a neighbor cell operated with a TS release with a higher version number than the version number of the TS release operated in the serving cell in operation 1019.

If there is the neighbor cell operated with the TS release with the higher version number than the version number of the TS release operated in the serving cell (Operation 1019—Yes), the electronic device may adjust measurement-related parameters for the neighbor cell operated with the TS release with the higher version number than the version number of the TS release operated in the serving cell based on the TS release operated in the neighbor cell in operation 1021. In this way, the electronic device may increase a case of reselection of the neighbor cell operated with the TS release with the higher version number than the version number of the TS release operated in the serving cell by adjusting the measurement-related parameters for the neighbor cell operated with the TS release with the higher version number than the version number of the TS release operated in the serving cell based on the TS release operated in the neighbor cell. In an embodiment of the disclosure, the measurement-related parameters may include cellReselectionPriority, t-ReselectionEUTRA, threshX-High, threshX-Low, and/or q-OffsetFreq, and the cellReselectionPriority, the t-ReselectionEUTRA, the threshX-High, threshX-Low, and/or the q-OffsetFreq may be implemented similarly to or the same as that described in operation 1017, so a detailed description thereof will be omitted herein.

In operation 1019, if there is no neighbor cell operated with the TS release with the higher version number than the version number of the TS release operated in the serving cell (Operation 1019—No), the electronic device may terminate an operation thereof without performing any further operation.

Figure 11:
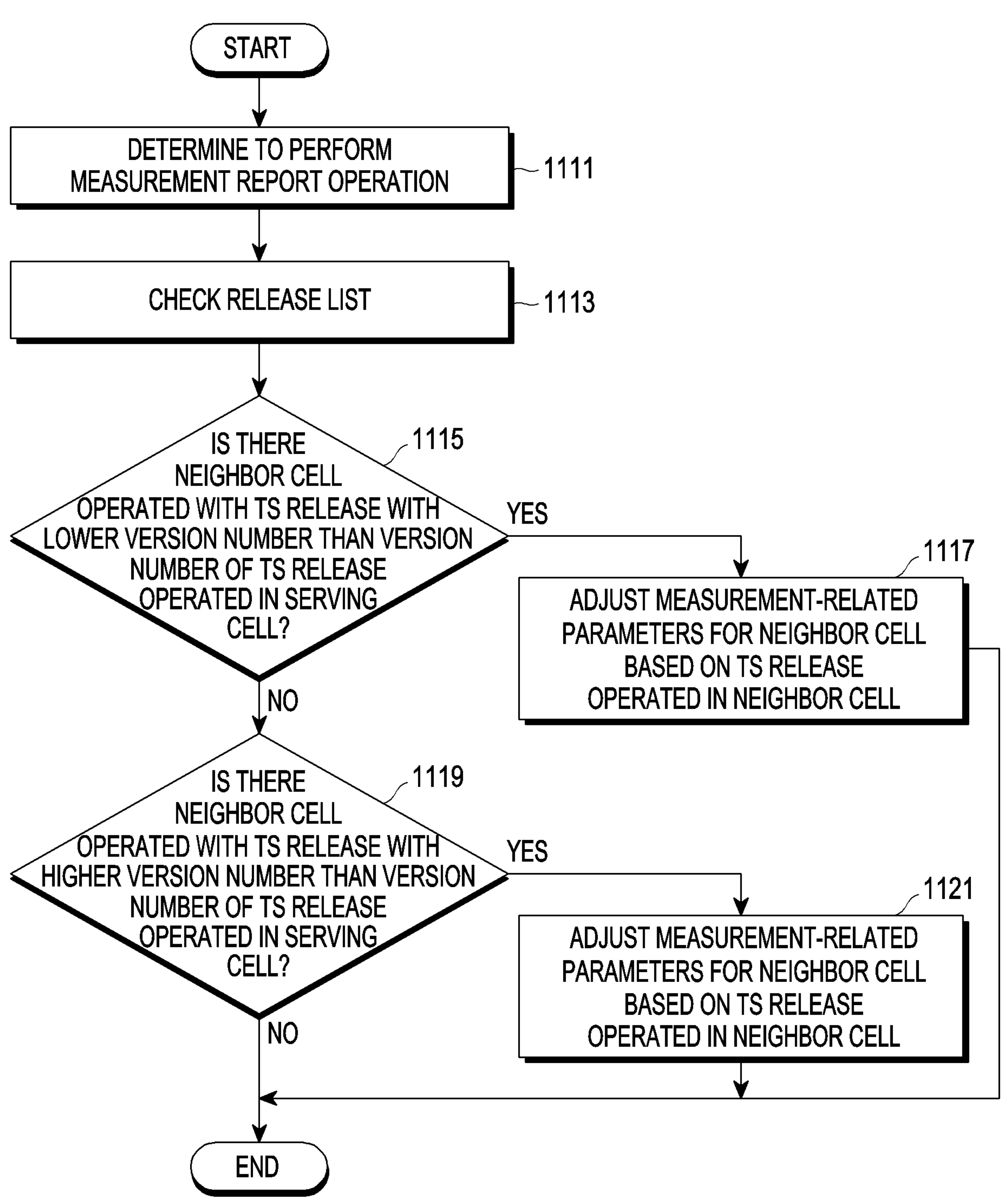
FIG. 11 is a flowchart illustrating an operating method of an electronic device according to an embodiment of the disclosure.

FIG. 11 is a flowchart illustrating an operating method of an electronic device according to an embodiment of the disclosure.

Referring to FIG. 11, an electronic device (e.g., an electronic device 101 in FIG. 1, 2A, 2B, 3A, 3B, or 3C) (e.g., the processor 120 in FIG. 1, the first communication processor 212 or a second communication processor 214 in FIG. 2A, or an integrated communication processor 260 in FIG. 2B) may determine to perform a measurement report operation in operation 1111. In an embodiment of the disclosure, the electronic device may determine to perform the measurement report operation when identifying that a set condition is satisfied.

When determining to perform the measurement report operation, the electronic device needs to perform a measurement operation on neighboring cells, and may check a release list in operation 1113. When checking the release list, the electronic device may identify whether there is a neighbor cell operated with a TS release with a lower version number than a version number of a TS release (e.g., a 3GPP TS release) operated in a serving cell to which the electronic device is currently attached in operation 1115. In an embodiment of the disclosure, a version number of a TS release currently operated in the electronic device is the same as the version number of the TS release operated in the serving cell, but a version number of a TS release supportable in the electronic device may be higher than the version number of the TS release operated in the serving cell. The reason may be that the electronic device may downgrade the version number of the TS release operated in the electronic device, as described in FIGS. 7A and 7B or FIGS. 8A and 8B. If there is the neighbor cell which is operated with the TS release with the lower version number than the version number of the TS release operated in the serving cell (Operation 1115—Yes), the electronic device may adjust measurement-related parameters for the neighbor cell operated with the TS release with the lower version number than the version number of the TS release operated in the serving cell based on the TS release operated in the neighbor cell in operation 1117. In this way, the electronic device may decrease a case of handover to the neighbor cell operated with the TS release with the lower version number than the version number of the TS release operated in the serving cell by adjusting the measurement-related parameters for the neighbor cell operated with the TS release with the lower version number than the version number of the TS release operated in the serving cell based on the TS release operated in the neighbor cell.

In an embodiment of the disclosure, the measurement-related parameters may include Ocn and/or time to trigger.

In an embodiment of the disclosure, the Ocn may include a cell specific offset of a neighbor cell.

In an embodiment of the disclosure, the time to trigger may indicate time at which specific conditions for an event need to be satisfied in order to trigger a measurement report.

In operation 1115, if there is no neighbor cell which is operated with the TS release with the lower version number than the version number of the TS release operated in the serving cell (Operation 1115—No), the electronic device may identify whether there is a neighbor cell operated with a TS release with a higher version number than the version number of the TS release operated in the serving cell in operation 1119.

If there is the neighbor cell operated with the TS release with the higher version number than the version number of the TS release operated in the serving cell (Operation 1119—Yes), the electronic device may adjust measurement-related parameters for the neighbor cell operated with the TS release with the higher version number than the version number of the TS release operated in the serving cell based on the TS release operated in the neighbor cell in operation 1121. In this way, the electronic device may increase a case of handover to the neighbor cell operated with the TS release with the higher version number than the version number of the TS release operated in the serving cell by adjusting the measurement-related parameters for the neighbor cell operated with the TS release with the higher version number than the version number of the TS release operated in the serving cell based on the TS release operated in the neighbor cell. In an embodiment of the disclosure, the measurement-related parameters may include Ocn and/or time to trigger, and the Ocn and/or the time to trigger may be implemented similarly to or the same as that described in operation 1117, so a detailed description thereof will be omitted herein.

In operation 1119, if there is no neighbor cell operated with the TS release with the higher version number than the version number of the TS release operated in the serving cell (Operation 1119—No), the electronic device may terminate an operation thereof without performing any further operation.

According to an embodiment of the disclosure, a method may include receiving, a user equipment (UE) capability enquiry (UCE) message requesting to transfer capability information of an electronic device (e.g., an electronic device (101) in FIG. 1, 2A, 2B, 3A, 3B, or 3C) from a network (e.g., an MN (310) or an SN (320) in FIG. 3A, an NR base station (350) in FIG. 3B, an LTE base station (340) or an NR base station (350) in FIG. 3C, or an external electronic device (400) in FIG. 4).

According to an embodiment of the disclosure, the method may include, in response to the UCE message, transmitting a UE capability information (UCI) message including the capability information of the electronic device to the network.

According to an embodiment of the disclosure, the method may include, in response to the UCI message, identifying whether a message is received from the network within a set time.

According to an embodiment of the disclosure, the method may include, based on identifying that the message is received within the set time, identifying whether the received message is a radio resource control (RRC) connection release message indicating to release an RRC connection.

According to an embodiment of the disclosure, the method may include, based on identifying that the received message is the RRC connection release message, identifying that a version number of a technical specification (TS) release operated in the electronic device is different from a version number of a TS release operated in the network.

According to an embodiment of the disclosure, the method may include, based on identifying that the message is not received within the set time, identifying that the version number of the TS release operated in the electronic device is different from the version number of the TS release operated in the network.

According to an embodiment of the disclosure, the method may include establishing the RRC connection with the network before transmitting the UCI message.

According to an embodiment of the disclosure, the method may include transmitting, to the network, an RRC connection setup complete message including an attach request message for registering with the network before transmitting the UCI message.

According to an embodiment of the disclosure, the method may include, based on identifying that the version number of the TS release operated in the electronic device is different from the version number of the TS release operated in the network, changing the TS release operated in the electronic device to another TS release with another version number.

According to an embodiment of the disclosure, the method may include establishing another RRC connection with the network based on the other TS release.

According to an embodiment of the disclosure, the method may include transmitting, to the network, another RRC connection setup complete message including another attach request message which is based on the other TS release.

According to an embodiment of the disclosure, the method may include, based on transmission of the other RRC connection setup complete message, receiving another UCE message which is based on the other TS release from the network.

According to an embodiment of the disclosure, the method may include, in response to the other UCE message, transmitting another UCI message which is based on the other TS release to the network.

According to an embodiment of the disclosure, the method may include, based on transmission of the other UCI message, receiving an RRC connection reconfiguration message including an attach accept message which is based on the other TS release from the network.

According to an embodiment of the disclosure, the method may include establishing the RRC connection with the network before transmitting the UCI message.

According to an embodiment of the disclosure, the method may include transmitting a uplink (UL) information transfer message including a tracking area update (TAU) request message for updating a tracking area to the network before transmitting the UCI message.

According to an embodiment of the disclosure, the method may include, based on identifying that the version number of the TS release operated in the electronic device is different from the version number of the TS release operated in the network, changing the TS release operated in the electronic device to another TS release with another version number.

According to an embodiment of the disclosure, the method may include establishing another RRC connection with the network based on the other TS release.

According to an embodiment of the disclosure, the method may include transmitting another UL information transfer message including another TAU request message which is based on the other TS release to the network.

According to an embodiment of the disclosure, the method may include, based on transmission of the other UL information transfer message, receiving another UCE message which is based on the other TS release from the network.

According to an embodiment of the disclosure, the method may include, in response to the other UCE message, transmitting another UCI message which is based on the other TS release to the network.

According to an embodiment of the disclosure, the method may include, based on transmission of the other UCI message, receiving a downlink (DL) information transfer message including a TAU accept message which is based on the other TS release from the network.

According to an embodiment of the disclosure, a method of may include receiving, from a network (e.g., an MN (310) or an SN (320) in FIG. 3A, an NR base station (350) in FIG. 3B, an LTE base station (340) or an NR base station (350) in FIG. 3C, or an external electronic device (400) in FIG. 4), a message including information related to a version number of a technical specification (TS) release operated in the network.

According to an embodiment of the disclosure, the method may include, based on the information related to the version number of the TS release operated in the network, identifying that a version number of a TS release operated in an electronic device (e.g., an electronic device (101) in FIG. 1, 2A, 2B, 3A, 3B, or 3C) is different from the version number of the TS release operated in the network.

According to an embodiment of the disclosure, the method may include, based on identifying that the version number of the TS release operated in the electronic device is different from the version number of the TS release operated in the network, changing the TS release operated in the electronic device to another TS release with another version number.

According to an embodiment of the disclosure, the method may include, receiving a user equipment (UE) capability enquiry (UCE) message requesting to transfer capability information of the electronic device which is based on the other TS release from the network.

According to an embodiment of the disclosure, the method may include, in response to the UCE message, transmitting a UE capability information (UCI) message including the capability information of the electronic device which is based on the other TS release to the network.

According to an embodiment of the disclosure, the method may include establishing a radio resource control (RRC) connection with the network based on the other TS release before transmitting the UCI message.

According to an embodiment of the disclosure, the method may include transmitting, to the network, one of an RRC connection setup complete message including an attach request message for registering with the network which is based on the other TS release, or a uplink (UL) information transfer message including a tracking area update (TAU) request message for updating a tracking area which is based on the other TS release before transmitting the UCI message.

According to an embodiment of the disclosure, the method may include, based on transmission of the UCI message, receiving a response message to the one of the RRC connection setup complete message or the UL information transfer message from the network.

According to an embodiment of the disclosure, a response message to the RRC connection setup complete message may include an RRC connection reconfiguration message including an attach accept message which is based on the other TS release.

According to an embodiment of the disclosure, a response message to the UL information transfer message may include a downlink (DL) information transfer message including a TAU accept message which is based on the other TS release.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a communication circuit;

at least one processor; and memory storing instructions that, when executed by the at least one processor individually or collectively, cause the electronic device to:

receive, a user equipment (UE) capability enquiry (UCE) message requesting to transfer capability information of the electronic device from a network via the communication circuit, based on receiving the UCE message, transmit a UE capability information (UCI) message including the capability information of the electronic device based on a first technical specification (TS) release of a first version number to the network via the communication circuit, identify whether a message is received after the transmission of the UCI message, from the network via the communication circuit, within a set time, based on identifying that the message is received after the transmission of the UCI message within the set time, identify whether the message received after the transmission of the UCI message within the set time is a radio resource control (RRC) connection release message indicating to release an RRC connection, based on identifying that the message received after the transmission of the UCI message within the set time is the RRC connection release message, change a TS release from the first TS release to a second TS release of a second version number different from the first version number, and establish another RRC connection with the network via the communication circuit based on the second TS release.

2. The electronic device of claim 1, wherein the instructions, when executed by the at least one processor individually or collectively, cause the electronic device to:

based on identifying that the message is not received within the set time, change the TS release from the first TS release to the second TS release, and establish another RRC connection with the network via the communication circuit based on the second TS release.

3. The electronic device of claim 1, wherein the instructions, when executed by the at least one processor individually or collectively, cause the electronic device to:

establish the RRC connection with the network via the communication circuit before transmitting the UCI message, and transmit, to the network via the communication circuit, an RRC connection setup complete message including an attach request message for registering with the network.

4. The electronic device of claim 2, wherein the instructions, when executed by the at least one processor individually or collectively, cause the electronic device to:

transmit, to the network via the communication circuit, another RRC connection setup complete message including another attach request message which is based on the second TS release.

5. The electronic device of claim 4, wherein the instructions, when executed by the at least one processor individually or collectively, cause the electronic device to:

based on transmission of the other RRC connection setup complete message, receive another UCE message which is based on the second TS release from the network via the communication circuit, based on reception of the other UCE message, transmit another UCI message which is based on the second TS release to the network via the communication circuit, and based on transmission of the other UCI message, receive an RRC connection reconfiguration message including an attach accept message which is based on the second TS release from the network via the communication circuit.

6. The electronic device of claim 1, wherein the instructions, when executed by the at least one processor individually or collectively, cause the electronic device to:

establish the RRC connection with the network via the communication circuit before transmitting the UCI message, and transmit a uplink (UL) information transfer message including a tracking area update (TAU) request message for updating a tracking area to the network via the communication circuit.

7. The electronic device of claim 6, wherein the instructions, when executed by the at least one processor individually or collectively, cause the electronic device to:

transmit another UL information transfer message including another TAU request message which is based on the second TS release to the network via the communication circuit.

8. The electronic device of claim 7, wherein the instructions, when executed by the at least one processor individually or collectively, cause the electronic device to:

based on transmission of the other UL information transfer message, receive another UCE message which is based on the second TS release from the network via the communication circuit, based on reception of the other UCE message, transmit another UCI message which is based on the second TS release to the network via the communication circuit, and based on transmission of the other UCI message, receive a downlink (DL) information transfer message including a TAU accept message which is based on the second TS release from the network via the communication circuit.

9. A method performed by an electronic device, the method comprising:

receiving, a user equipment (UE) capability enquiry (UCE) message requesting to transfer capability information of the electronic device from a network;

based on receiving the UCE message, transmitting a UE capability information (UCI) message including the capability information of the electronic device based on a first technical specification (TS) release of a first version number to the network;

identifying whether a message is received after the transmission of the UCI message, from the network, within a set time;

based on identifying that the message is received after the transmission of the UCI message within the set time, identifying whether the message received after the transmission of the UCI message within the set time is a radio resource control (RRC) connection release message indicating to release an RRC connection;

based on identifying that the message received after the transmission of the UCI message within the set time is the RRC connection release message or based on identifying that the message is not received within the set time, changing a TS release from the first TS release to a second TS release of a second version number different from the first version number; and establishing another RRC connection with the network based on the second TS release.

10. The method of claim 9, further comprising:

establishing the RRC connection with the network before transmitting the UCI message; and transmitting, to the network, an RRC connection setup complete message including an attach request message for registering with the network.

11. The method of claim 9, further comprising:

transmitting, to the network, another RRC connection setup complete message including another attach request message which is based on the second TS release.

12. The method of claim 11, further comprising:

based on transmission of the other RRC connection setup complete message, receiving another UCE message which is based on the second TS release from the network;

based on reception of the other UCE message, transmitting another UCI message which is based on the second TS release to the network; and based on transmission of the other UCI message, receiving an RRC connection reconfiguration message including an attach accept message which is based on the second TS release from the network.

13. The method of claim 9, further comprising:

establishing the RRC connection with the network before transmitting the UCI message; and transmitting a uplink (UL) information transfer message including a tracking area update (TAU) request message for updating a tracking area to the network.

14. The method of claim 13, further comprising:

transmitting another UL information transfer message including another TAU request message which is based on the second TS release to the network.

15. The method of claim 14, further comprising:

based on transmission of the other UL information transfer message, receiving another UCE message which is based on the second TS release from the network;

based on reception of the other UCE message, transmitting another UCI message which is based on the other-second TS release to the network; and based on transmission of the other UCI message, receiving a downlink (DL) information transfer message including a TAU accept message which is based on the second TS release from the network.

16. A non-transitory storage medium storing at least one computer-readable instruction, the at least one instruction, when executed by a at least one processor of an electronic device individually or collectively, causing the electronic device to perform at least one operation, the at least one operation comprising:

receiving, a user equipment (UE) capability enquiry (UCE) message requesting to transfer capability information of the electronic device from a network;

based on receiving the UCE message, transmitting a UE capability information (UCI) message including the capability information of the electronic device based on a first technical specification (TS) release of a first version number to the network;

identifying whether a message is received after the transmission of the UCI message, from the network, within a set time;

identifying whether the message received after the transmission of the UCI message within the set time is a radio resource control (RRC) connection release message indicating to release an RRC connection, based on identifying that the message is received after the transmission of the UCI message within the set time;

changing a TS release from the first TS release to a second TS release of a second version number different from the first version number, based on identifying that the message received after the transmission of the UCI message within the set time is the RRC connection release message or based on identifying that the message is not received within the set time; and establishing another RRC connection with the network based on the second TS release.

17. The non-transitory storage medium of claim 16, wherein the at least one operation further comprises:

establishing the RRC connection with the network before transmitting the UCI message; and transmitting, to the network, an RRC connection setup complete message including an attach request message for registering with the network.

18. The non-transitory storage medium of claim 16, wherein the at least one operation further comprises:

transmitting, to the network, another RRC connection setup complete message including another attach request message which is based on the second TS release.

19. The non-transitory storage medium of claim 18, wherein the at least one operation further comprises:

receiving another UCE message which is based on the second TS release from the network, based on transmission of the other RRC connection setup complete message;

transmitting another UCI message which is based on the second TS release to the network, based on reception of the other UCE message; and receiving an RRC connection reconfiguration message including an attach accept message which is based on the second TS release from the network, based on transmission of the other UCI message.

20. The non-transitory storage medium of claim 16, wherein the at least one operation further comprises:

establishing the RRC connection with the network before transmitting the UCI message; and transmitting a uplink (UL) information transfer message including a tracking area update (TAU) request message for updating a tracking area to the network.

* * * * *